(12) United States Patent
Wada et al.

(10) Patent No.: US 8,438,179 B2
(45) Date of Patent: May 7, 2013

(54) STORAGE MEDIUM STORING TROUBLE HANDLING PROGRAM, AND TROUBLE HANDLING APPARATUS

(75) Inventors: Yuji Wada, Kawasaki (JP); Yasuhide Matsumoto, Kawasaki (JP); Yukihiro Watanabe, Kawasaki (JP); Kuniaki Shimada, Kawasaki (JP); Masazumi Matsubara, Kawasaki (JP); Kenji Morimoto, Imizu (JP); Hiroshi Otsuka, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 12/491,998

(22) Filed: Jun. 25, 2009

(65) Prior Publication Data
US 2010/0070462 A1   Mar. 18, 2010

(30) Foreign Application Priority Data
Sep. 17, 2008   (JP) .................................. 2008-238221

(51) Int. Cl.
G06F 17/30 (2006.01)
G06F 7/00 (2006.01)

(52) U.S. Cl.
USPC ............ 707/765; 707/748; 707/769; 707/812

(58) Field of Classification Search ........................ None
See application file for complete search history.

(56) References Cited

U.S. PATENT DOCUMENTS

| | | | | |
|---|---|---|---|---|
| 4,633,467 A | * | 12/1986 | Abel et al. | 714/45 |
| 5,214,653 A | * | 5/1993 | Elliott et al. | 714/26 |
| 5,253,184 A | * | 10/1993 | Kleinschnitz | 702/184 |
| 5,799,317 A | * | 8/1998 | He et al. | 1/1 |
| 6,012,152 A | * | 1/2000 | Douik et al. | 714/26 |
| 6,324,659 B1 | * | 11/2001 | Pierro | 714/48 |
| 6,343,236 B1 | | 1/2002 | Gibson et al. | |
| 6,415,395 B1 | * | 7/2002 | Varma et al. | 714/37 |
| 6,446,224 B1 | * | 9/2002 | Chang et al. | 714/54 |

(Continued)

FOREIGN PATENT DOCUMENTS

| | | |
|---|---|---|
| GB | 2 412 271 | 9/2005 |
| JP | A 8-221295 | 8/1996 |
| WO | WO 2009/122525 A1 | 10/2009 |

OTHER PUBLICATIONS

Office Action issued from the UK Patent Office in corresponding UK Patent Application No. GB0911136.0, mailed Mar. 19, 2012.

*Primary Examiner* — Jung Kim
*Assistant Examiner* — James J Wilcox
(74) *Attorney, Agent, or Firm* — Greer Burns & Crain, Ltd.

(57) ABSTRACT

A computer-readable portable storage medium storing a trouble handling program for causing a computer to execute a process for knowledgizing past trouble handling cases in information systems, and for recommending handling methods based on trouble handling knowledge obtained by knowledgizing and symptoms of troubles when they occur, including a searching process for obtaining candidates of handling methods for troubles requested to be handled by searching the trouble handling knowledge; a recording process for recording to a storing unit a history of handling methods executed for each symptom as handling history information; a priority assigning process for assigning priorities to the handling method candidates obtained by the searching process, with reference to the handling history information; and a process for returning to a handling request source the handling methods for the troubles requested to be handled after assigning priorities based on priority assignment information obtained by the priority assigning process.

13 Claims, 20 Drawing Sheets

U.S. PATENT DOCUMENTS

| | | | |
|---|---|---|---|
| 6,631,384 B1 * | 10/2003 | Richman et al. | 1/1 |
| 6,651,034 B1 * | 11/2003 | Hedlund et al. | 702/183 |
| 6,895,585 B2 * | 5/2005 | Smith | 718/103 |
| 6,912,676 B1 * | 6/2005 | Gusler et al. | 714/47.1 |
| 7,143,316 B2 * | 11/2006 | Christodoulou et al. | 714/43 |
| 7,237,138 B2 * | 6/2007 | Greenwald et al. | 714/4.3 |
| 7,409,595 B2 * | 8/2008 | Nissan-Messing et al. | 714/26 |
| 8,271,402 B2 * | 9/2012 | Fisher, Jr. | 706/12 |
| 2007/0276631 A1 | 11/2007 | Subramanian et al. | |
| 2007/0294003 A1 * | 12/2007 | Underdal et al. | 701/29 |
| 2009/0157678 A1 * | 6/2009 | Turk | 707/6 |
| 2011/0016355 A1 | 1/2011 | Watanabe et al. | |

* cited by examiner

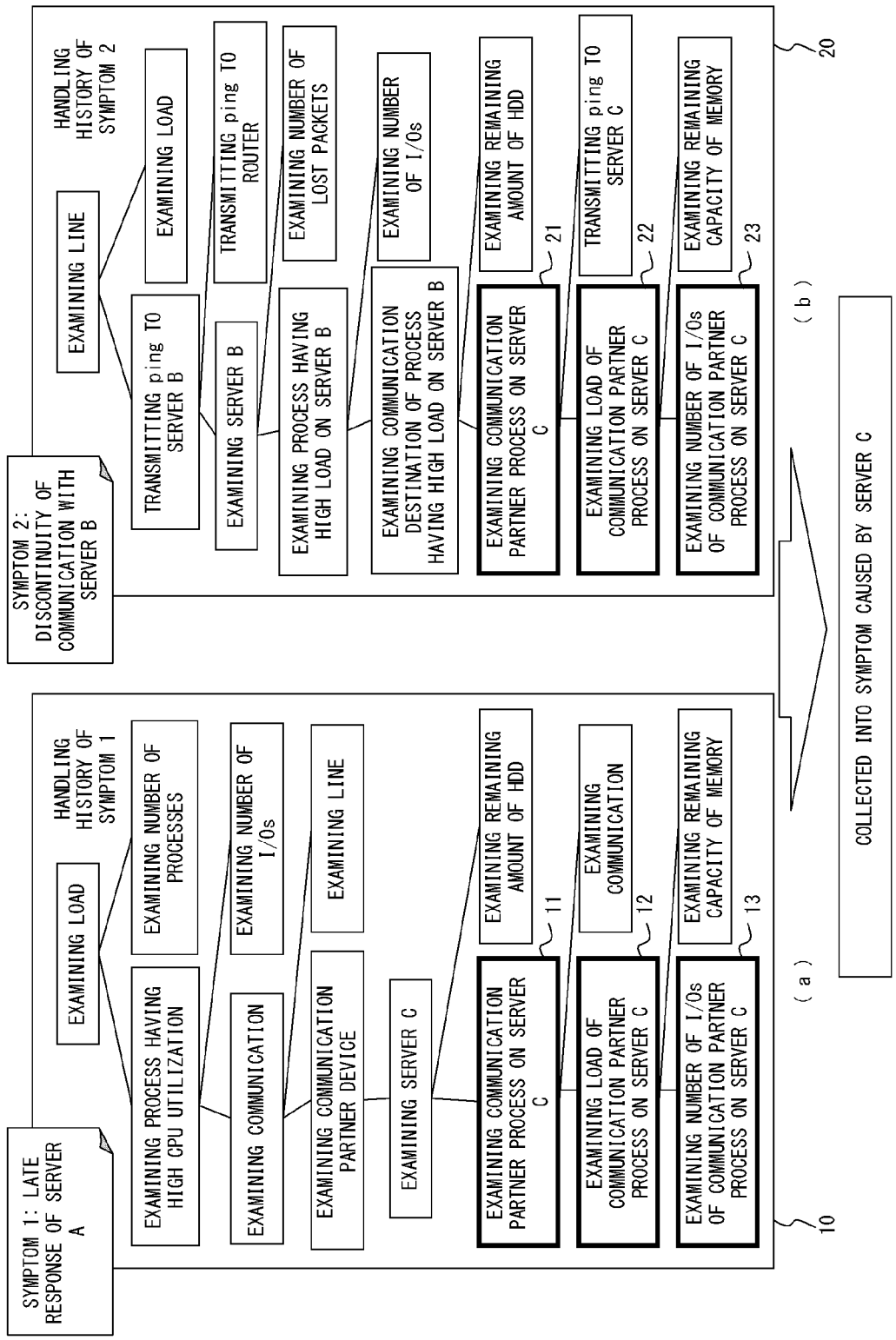
F I G. 1

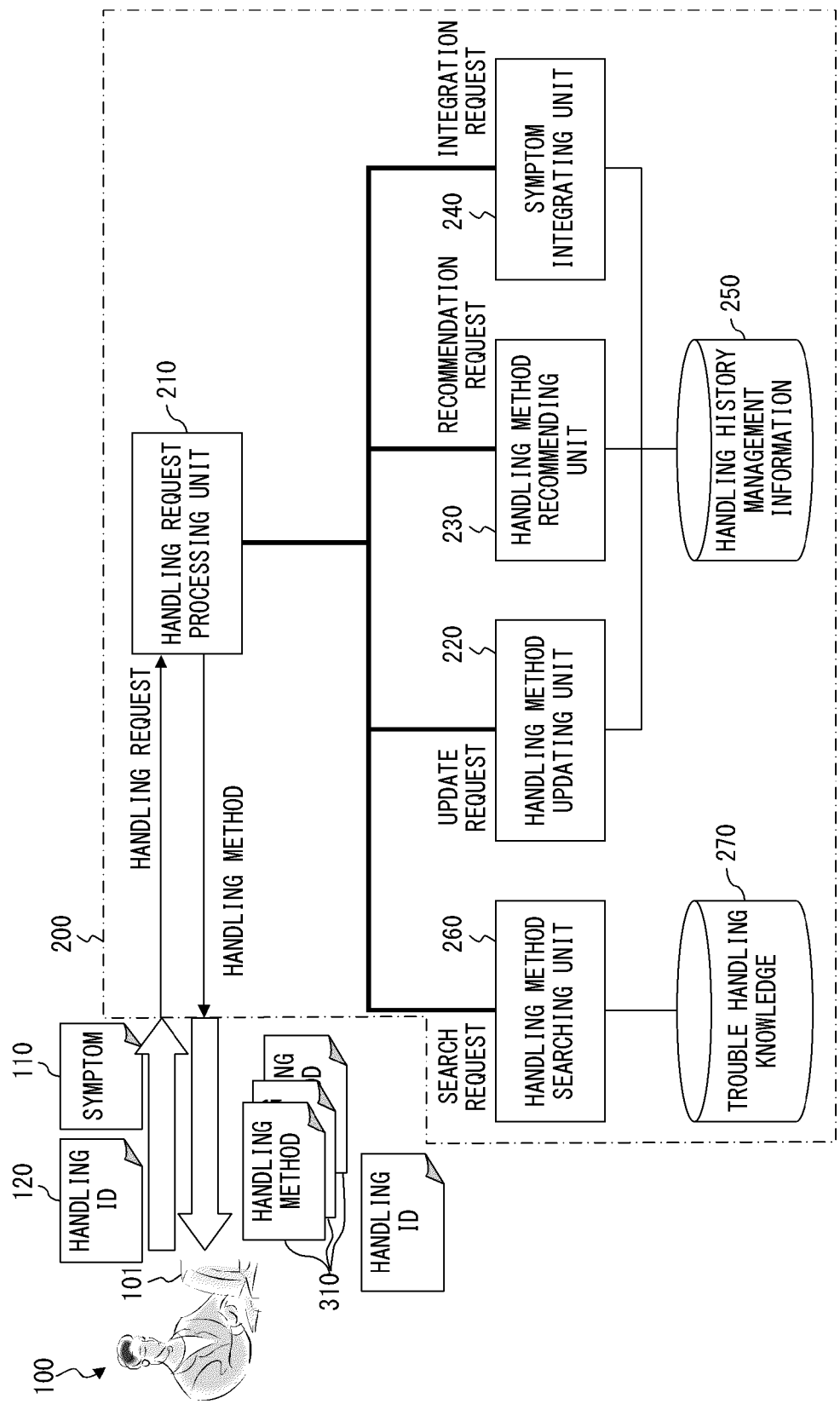
F I G. 5

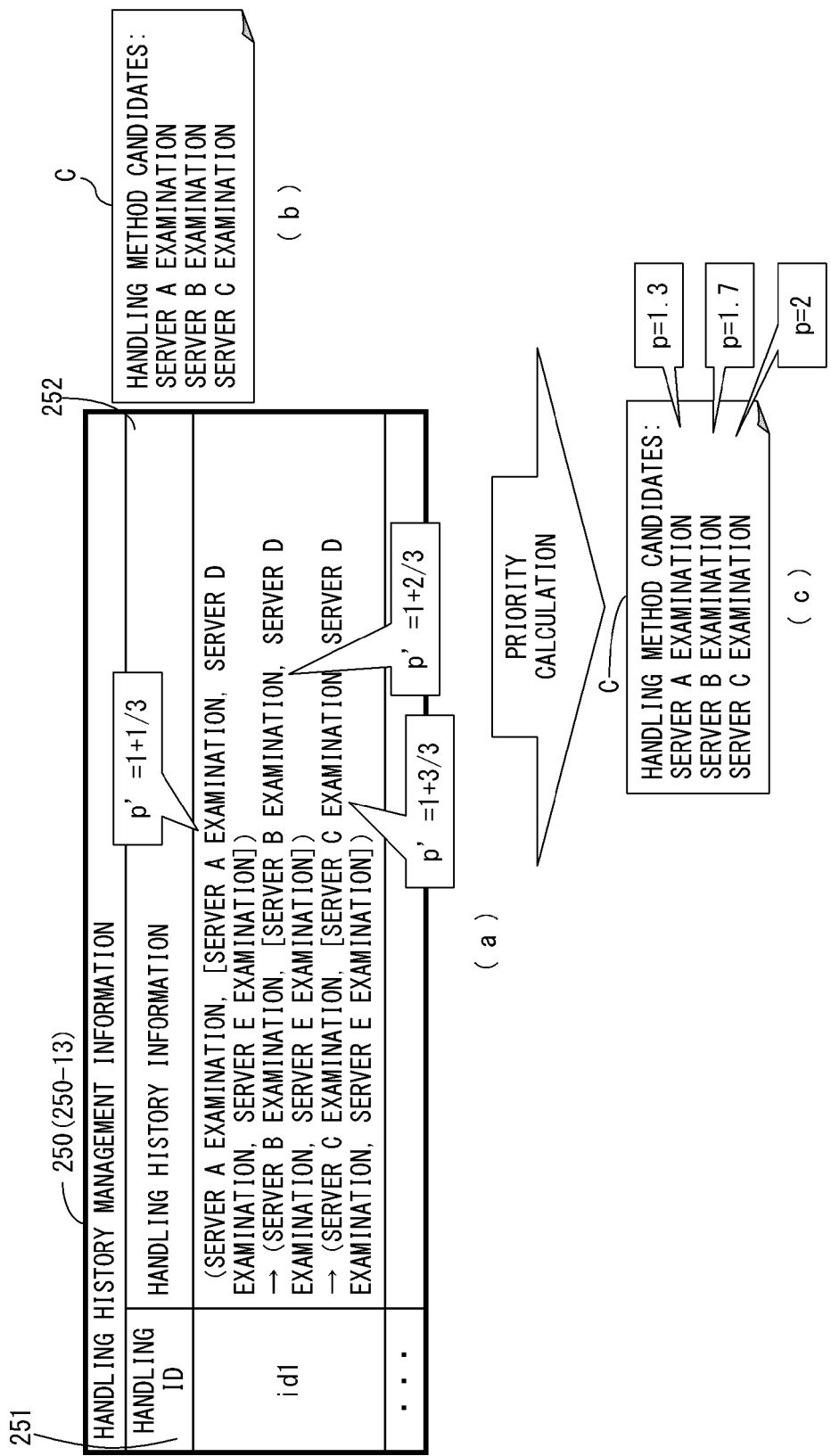
F I G. 14

(a) RATIO OF COMMON PORTIONS TO ENTIRE HANDLING HISTORY IS EQUAL TO OR LARGER THAN CERTAIN VALUE
  · HISTORY 1 : A→B→C→D→E, HISTORY 2 : F→G→C→D→E, CERTAIN VALUE : 50%

(b) ONE HANDLING HISTORY MATCHES FORWARD PORTION OF ANOTHER HANDLING HISTORY
  · HISTORY 1 : A→B→C→D→E, HISTORY 2 : A→B→C, CERTAIN VALUE : 50%

(c) ONE HANDLING HISTORY IS INCLUDED IN ANOTHER HANDLING HISTORY
  · HISTORY 1 : A→B→C→D→E, HISTORY 2 : B→C→D, CERTAIN VALUE : 50%

(d) ONE HANDLING HISTORY MATCHES BACKWARD PORTION OF ANOTHER HANDLING HISTORY
  · HISTORY 1 : A→B→C→D→E, HISTORY 2 : C→D→E, CERTAIN VALUE : 50%

F I G. 1 9

STORAGE MEDIUM STORING TROUBLE HANDLING PROGRAM, AND TROUBLE HANDLING APPARATUS

CROSS-REFERENCE TO RELATED APPLICATIONS

This application is based upon and claims the benefit of priority of the prior Japanese Patent Application No. 2008-238221, filed on Sep. 17, 2008, the entire contents of which are incorporated herein by reference.

FIELD

The technique described in this specification relates to a technique for handling a cause of a trouble having a plurality of symptoms in an information system.

BACKGROUND

In an information system, diverse troubles occur. Accordingly, it is essential to assist a trouble recovery. The trouble recovery in an information system is generally handled by obtaining a handling method according to a symptom of a trouble from a knowledge base that accumulates past trouble cases, and by actually attempting the method.

FIG. 20 is a schematic diagram illustrating a conventional trouble handling method.

In the system illustrated in FIG. 20, past trouble cases 1001 are put into knowledge data, which is then registered to a knowledge base 2000. The knowledge base 2000 stores records each composed of a symptom and its corresponding handling methods. When a user 3000 such as a system administrator, etc. inputs a symptom 3003 from a terminal 3001, etc., the knowledge base 2000 is searched by using the symptom 3003 as a key. Then, a cause, handling methods, etc. are returned to the terminal 3001 of the user 3000 as search results 2003, and displayed on the screen of the terminal 3001.

As described above, conventional trouble handling systems put trouble handling cases occurring in the past into knowledge data, accumulate the knowledge data in a knowledge base, etc., and recommend handling methods, etc. by searching the knowledge base on the basis of a symptom, etc. when a trouble occurs.

SUMMARY

A computer-readable portable storage medium according to an embodiment, on which is stored a trouble handling program for causing a computer to execute a process for putting trouble handling cases occurring in the past in an information system into knowledge data, and for recommending a handling method on the basis of a trouble handling knowledge obtained by putting the trouble handling cases into the knowledge data, and a symptom of a trouble when the trouble occurs, comprises: a searching process for obtaining candidates of a handling method for a trouble requested to be handled by searching the trouble handling knowledge; a recording process for recording to a storing unit a history of handling methods executed for each symptom as handling history information; a priority assigning process for assigning priorities to the candidates of the handling method (handling method candidates), which are obtained by the searching process, with reference to the handling history information; and a process for returning to a handling request source the handling method for the trouble requested to be handled after assigning a priority to the handling method on the basis of priority assignment information obtained by the priority assigning process.

A trouble handling apparatus according to an embodiment for putting trouble handling cases occurring in the past in an information system into knowledge data, and for recommending a handling method on the basis of a trouble handling knowledge obtained by putting the trouble handling cases into the knowledge data, and a symptom of a trouble when the trouble occurs, comprises: a searching unit for obtaining candidates of a handling method for a trouble requested to be handled by searching the trouble handling knowledge; a recording unit for recording to a storing unit a history of handling methods executed for each symptom as handling history information; a priority assigning unit for assigning priorities to the candidates of the handling method (handling method candidates), which are obtained by the searching unit, with reference to the handling history information stored in the storing unit; and a recommending unit for returning to a handling request source the handling method for the trouble requested to be handled after assigning a priority to the handling method on the basis of priority assignment information obtained by the priority assigning unit.

A trouble handling apparatus according to an embodiment for putting trouble handling cases occurring in the past in an information system into knowledge data, and for recommending a handling method on the basis of a trouble handling knowledge obtained by putting the trouble handling cases into the knowledge data, and a symptom of a trouble when the trouble occurs, comprises: a handling history management information storing unit for storing handling history management information including a pair of each handling ID and handling history information corresponding to each handling ID; a handling request processing unit for receiving a handling request including a handling ID and a symptom of a trouble from a terminal of a user, and for returning a handling ID and a handling method in response to the handling request; a handling method searching unit for obtaining candidates of a handling method (handling method candidates) corresponding to the symptom of the trouble included in the handling request by searching the trouble handling knowledge; a handling method recommending unit for assigning priorities to the handling method candidates, which are obtained by the handling method searching unit, with reference to the handling history management information recorded in the handling history management information storing unit, for adding a pair of the handling ID and the handling methods (handling method candidates) assigned with the priorities to the handling history management information within the handling history management information storing unit as handling history information, and for passing the handling methods assigned with the priorities to the handling request processing unit; and a handling method updating unit for updating a handling method within a handling history of handling history information corresponding to the handling ID, which is included in the handling request within the handling history management information recorded in the handling history management information storing unit, with a handling method that is included in the handling request received by the handling request processing unit and executed by the user.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 1 illustrates a solution image of an aspect (1);

FIG. 5 is a block diagram illustrating a configuration of a trouble handling system;

FIG. 14 is an explanatory view (No. 2) of a method for calculating a priority in consideration of one handling;

FIG. 19 illustrates an example of a determination method executed in step S66 of the flowchart of FIG. 17.

DESCRIPTION OF EMBODIMENT

Figure 2:
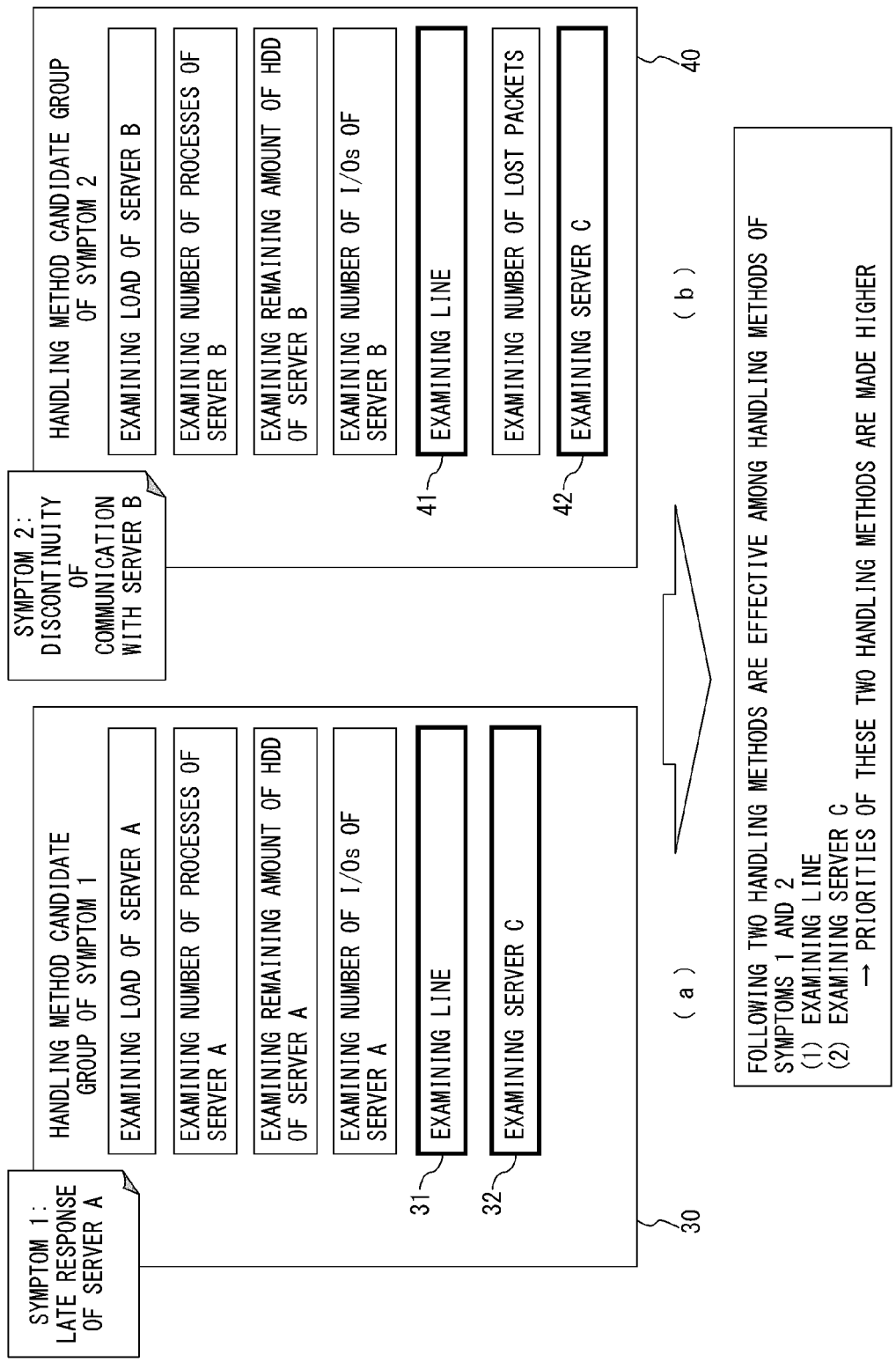
FIG. 2 illustrates a solution image of an aspect (2), in which (a) and (b) represent handling method candidates of symptoms 1 and 2, respectively.

On an actual trouble recovery site, there has been a demand for allowing a plurality of troubles to be efficiently handled. For example, there has been a demand for collectively handling a plurality of symptoms when they result from the same cause. However, it cannot be easily identified which of the plurality of symptoms result from the same cause. In such a situation, a user desires at least to efficiently handle the trouble.

Here, the following problems are found by organizing the conventional trouble handling methods.

[Method for Collectively Handling a Plurality of Symptoms when they Result from the Same Cause]

(1) if a cause is explicitly found

A plurality of symptoms are collected into one symptom.

Actually, however, a cause cannot be explicitly found in many cases.

(2) if a cause cannot be explicitly found

Symptoms expected to result from the same cause are narrowed down by using an occurrence time, past cases, etc. and collected into one symptom.

However, it is not easy to expect that symptoms result from the same cause, and such an expectation requires a lot of time and labor.

A trouble handling program according to an embodiment is a trouble handling program for causing a computer to execute a process for putting trouble handling cases, which occur in the past in an information system, into knowledge data, and for recommending a handling method on the basis of a trouble handling knowledge obtained by putting the trouble handling cases into the knowledge data, and a symptom of a trouble when the trouble occurs.

The embodiment according to the present invention is described below with reference to the drawings.

The embodiments according to the present invention are described.

(1) Symptoms are individually handled, and symptoms for which handling methods having a lot of common portions are executed are collected into one symptom.

In this case, each of the handling histories of the symptoms is organized as an image of a tree structure, and symptoms that pass through a lot of common paths are collected into the same symptom, as described below. In this way, symptoms resulting from the same cause are naturally collected into one symptom while being handled. This produces effects such as reductions in manpower required for handling, avoidance of duplicate operations, reductions in time and labor required to collect symptoms, and the like.

(2) Also an operation required for another handling is considered when a handling method is recommended.

Here, total optimization is performed also in consideration of another symptom simultaneously in progress. As a result, a handling method is recommended also for a symptom that results from the same cause and cannot be collected into the same symptom in consideration of other symptoms. This produces effects such as reductions in the total handling time, and reductions in time and labor.

[Details of the Aspects (1) and (2)]

Specific images of the above described aspects (1) and (2) are described next with reference to the drawings.

{Aspect 1}

FIG. 1 illustrates a solution image of the aspect (1). FIG. 1(a) is a tree structure that represents the handling history of a symptom 1, whereas FIG. 1(b) illustrates a tree structure that represents the handling history of a symptom 2. Here, the symptom 1 is "late response of a server A", and the symptom 2 is "discontinuity of a communication with a server B".

In FIGS. 1(a) and 1(b), common handling methods are portions enclosed with thick-line rectangles. Namely, handling methods 11, 12 and 13 in the handling history 10 of the symptom 1, and handling methods 21, 22 and 23 in the handling history 20 of the symptom 2 are common. Accordingly, in this case, the handling methods 11 (21), 12 (22) and 13 (23) are collected as "a symptom caused by a server C".

{Aspect 2}

FIG. 2 illustrates a solution image of the aspect (2). FIG. 2(a) illustrates handling method candidates of the symptom 1, whereas FIG. 2(b) illustrates handling method candidates of the symptom 2.

Each of the handling method candidates (handling methods) within a handling method candidate group 30 illustrated in FIG. 2(a) is extracted from the handling history 10 illustrated in FIG. 1(a). Each of the handling method candidates (handling methods) within a handling method candidate group 40 illustrated in FIG. 2(b) is extracted from the handling history 20 illustrated in FIG. 1(b). In FIGS. 2(a) and 2(b), common handling methods in the handling method candidate groups 30 and 40 are portions enclosed with thick-line rectangles. Namely, the handling methods 31 and 32 within the handling method candidate group 30, and the handling methods 41 and 42 within the handling method candidate group 40 are common. Accordingly, in this case, the handling methods 31 (41) and 32 (42) are determined to be effective in the handlings of the symptoms 1 and 2, and the priorities of these two handling methods ("line examination" and "server C examination") are made higher.

Embodiment

{System Outline}

The outline of the system according to this embodiment is initially described with reference to FIGS. 3 and 4.

Figure 3:
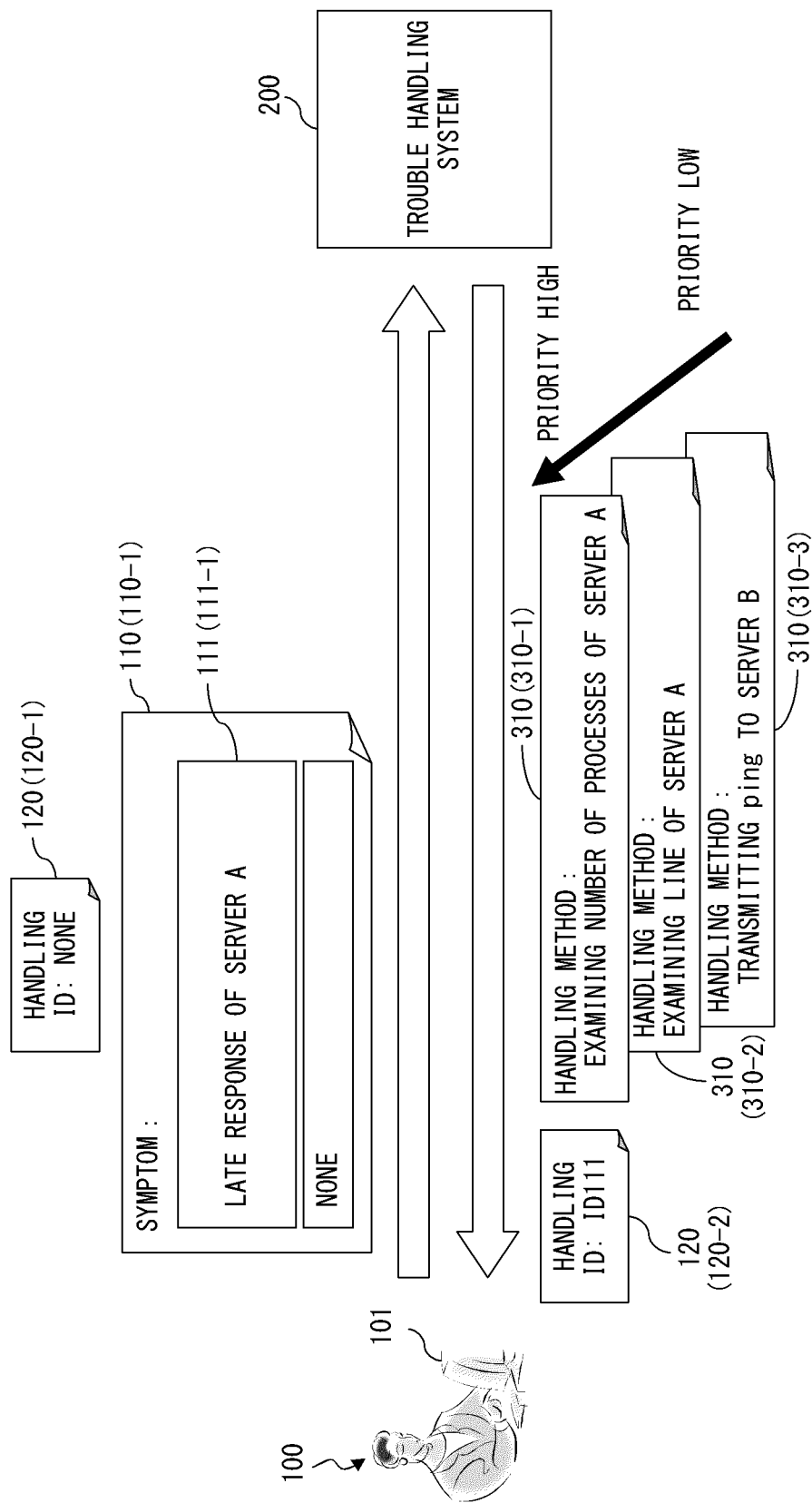
FIG. 3 is a schematic diagram (No. 1) illustrating the outline of a system according to an embodiment.

As illustrated in FIG. 3, when the response of the server A becomes late, a user 100 transmits a symptom 110 (110-1), which includes an initial symptom 111 (111-1) "late response of the server A" and a performed handling 112, from a terminal 101 of the user 100 himself to the trouble handling system 200 according to this embodiment. At this time point, a handling ID 120 (120-1) is set to "none" (unset). Moreover, since the user 100 has not performed handling yet for the symptom, also performed handling 112-1 is set to "none".

The trouble handling system 200 returns a plurality of handling methods (three handling methods in this example) assigned with priorities to the terminal 101 of the user 100 upon receipt of the handling request 110-1. In this example, a handling method 310-1 (examination of the number of processes of the server A), a handling method 310-2 (examination of the line of the server A), and a handling method 310-3 (transmission of ping to the server B) are returned to the terminal 101 of the user 100. Here, priorities are assigned to the handling methods 310-1, 310-2 and 310-3 in this order. Moreover, "ping" used by the handling method 310-3 is a command for examining whether or not the server B is properly working on a TCP/IP network.

Additionally, the trouble handling system 200 assigns a handling ID 120 (120-2) having an identifier of ID111 to the handling methods 310-1 to 310-3 at this time, and returns the handling ID 120-2 to the terminal 101 of the user 100. Thereafter, the user 100 and the trouble handling system 200 make communications about the trouble at this time by using the handling ID 120-2.

The user 100 attempts the above described handling methods 310-1 to 310-3 upon receipt of these methods from the trouble handling system 200. Then, as illustrated in FIG. 4, the user 100 transmits to the trouble handling system 200 a symptom 110 (110-2), which includes a symptom 111 (111-2) proved by the handling at this time (such as "the number of processes of the server A is large") and handling 112 performed at this time ("examination of the number of processes of the server A") in addition to the above described initial symptom 111-1. In the meantime, the trouble handling system 200 returns to the terminal 101 of the user 100 a handling method 310-4 ("examination of the number of I/Os of the server A"), the above described handling method 310-3, and a handling method 310-5 ("transmission of ping to the server C") along with the handling ID 120-2 (ID 111). In this case, priorities are assigned to the handling methods 310-4, 310-3 and 310-5 in this order.

The user 100 continues to transmit to the trouble handling system 200 the handling request including "the initial symptom", "a symptom proved by handling", and "performed handling" by using the handling ID 120 as an identifier as described above until the trouble is solved. The trouble handling system 200 returns handling methods assigned with priorities to the user 100 along with the handling ID 120 each time it receives the handling request from the user 100.

[System Configuration]

Figure 4:
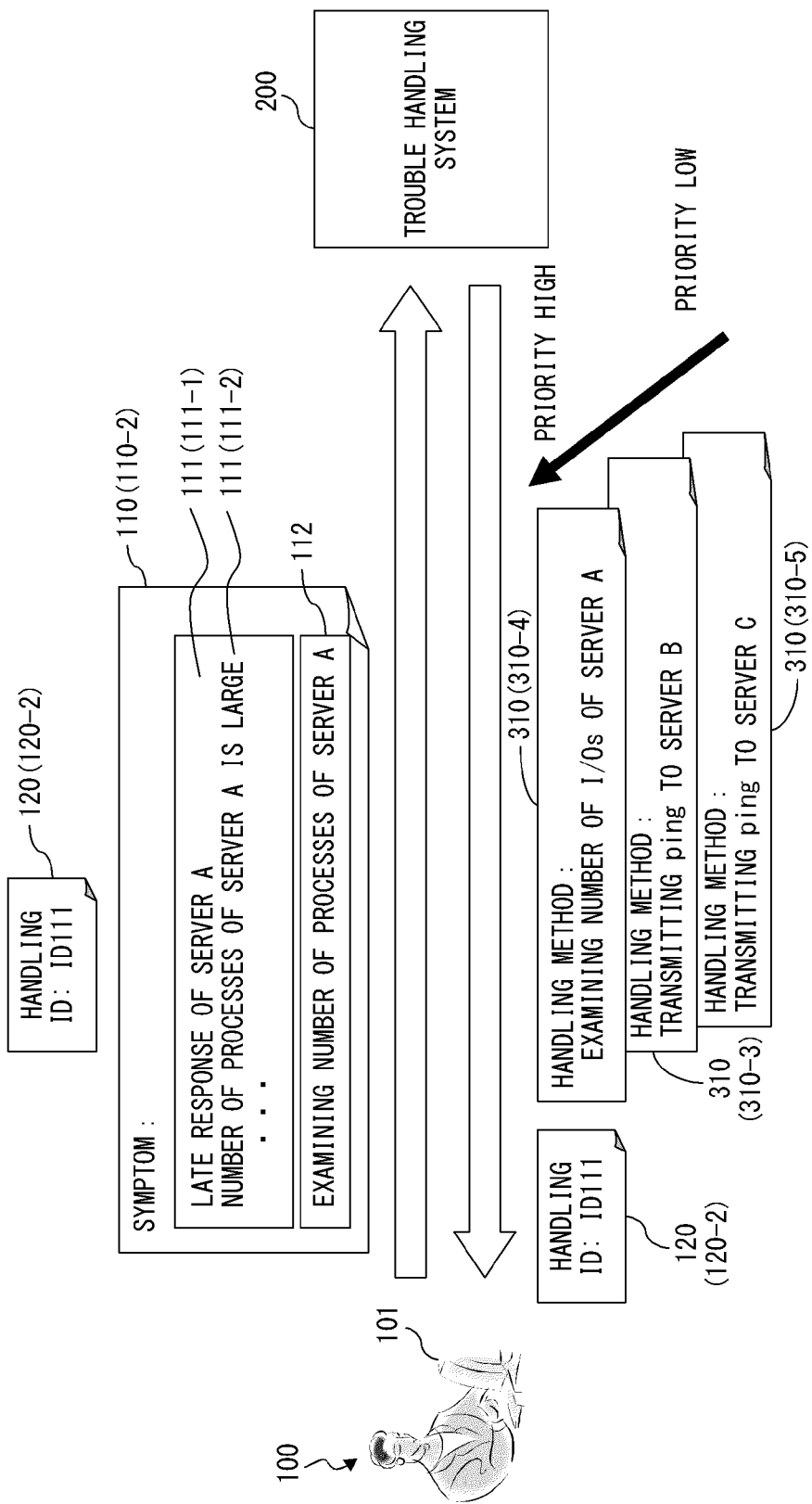
FIG. 4 is a schematic diagram (No. 2) illustrating the outline of the system according to the embodiment.

FIG. 5 is a block diagram illustrating a configuration of the trouble handling system 200 illustrated in FIGS. 3 and 4.

The trouble handling system 200 includes a handling request processing unit 210, a handling method updating unit 220, a handling method recommending unit 230, a symptom integrating unit 240, handling history management information 250, a handling method searching unit 260, and a trouble handling knowledge 270.

The handling request processing unit 210 exchanges a handling request and a handling method with the terminal 101 of the user 100 by using the above described method illustrated in FIGS. 3 and 4. The handling request includes the handling ID 120 and the symptom 110, whereas the handling method includes the handling ID 120 and handling methods 310. The handling request processing unit 210 requests the handling method searching unit 260 to search handling method candidates corresponding to the received symptom upon receipt of the handling request from the terminal 101 of the user 100. Additionally, the handling request processing unit 210 requests the handling method updating unit 220 to update a handling method actually executed by the user 100. The handling request processing unit 210 also requests the handling method updating unit 220 to assign priorities to search results returned from the handling method searching unit 260. Furthermore, the handling request processing unit 210 requests the symptom integrating unit 240 to integrate a symptom being handled (the symptom handled so far) with the symptom received from the terminal 101 of the user 100 at this time. Then, the handling request processing unit 210 returns the handling ID and the handling methods, which correspond to the integration results of the symptom integrating unit 240, to the terminal 101 of the user 100.

The handling history management information 250 is a table that manages handling history information about each symptom (history information about handling methods executed in the past) by making the handling history information correspond to a handling ID.

The trouble handling knowledge 270 is a database that stores handling methods corresponding to each symptom.

Upon receipt of a search request from the handling request processing unit 210, the handling method searching unit 260 searches for the trouble handling knowledge 270. As a result, the handling method searching unit 260 obtains handling method candidates corresponding to the symptom received from the handling request processing unit 210. Then, the handling method searching unit 260 returns the obtained candidates to the handling request processing unit 210.

Upon receipt of an update request from the handling request processing unit 210, the handling method updating unit 220 updates the handling history information corresponding to the handling ID within the handling history management information 250.

Upon receipt of a recommendation request from the handling request processing unit 210, the handling method recommending unit 230 assigns priorities to the handling method candidates searched by the handling method searching unit 260 with reference to the handling history management information 250. Then, the handling method recommending unit 230 returns the priorities of the respective handling method candidates to the handling request processing unit 210.

The symptom integrating unit 240 receives an integration request from the handling request processing unit 210. Then, the symptom integrating unit 240 examines whether or not another handling ID within the handling history management information 250 exists which has a handling history information having a lot of portions in handling methods, which are common to handling history management information related to the handling ID currently being processed, by referencing the handling history management information 250. If such a handling ID exists, the symptom integrating unit 240 integrates the handling history information of this handling ID. Then, the symptom integrating unit 240 returns the integrated handling history information to the handling request processing unit 210.

<Hardware Configuration of a Computer in Which This Embodiment is Implemented>

Figure 6:
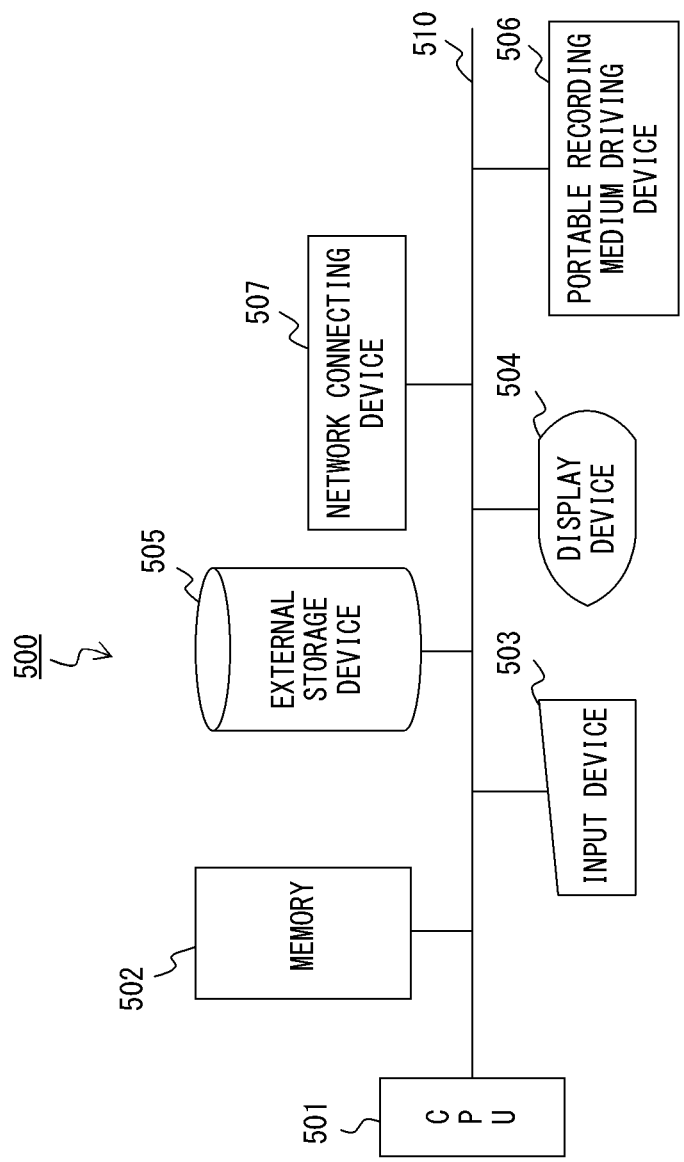
FIG. 6 illustrates a hardware configuration of a computer that implements the trouble handling system according to the embodiment illustrated in FIG. 5 by executing a program.

FIG. 6 illustrates a hardware configuration of a computer that implements the trouble handling system 200 according to this embodiment illustrated in FIG. 5 by executing a program.

The computer 500 illustrated in FIG. 6 includes a CPU 501, a memory 502, an input device 503, a display device 504, an external storage device 505, a portable storage medium driving device 506, a network connecting device 507, and a bus 510 that interconnects the CPU 501 and each of the components 502 to 507.

The CPU 501 is a central processing unit for controlling the operations of the entire system of the computer 500. The memory 502 is a main storage device having an area into which the program executed by the CPU 501 is loaded, and a working area that stores intermediate data when the program is executed. The input device 503 has a pointing device such as a keyboard, a mouse, etc. The display device 504 is a CRT display, a liquid crystal display, etc. The external storage device 505 is an HDD (Hard Disk Drive), an SSD (Solid State Drive), etc. The portable storage medium driving device 506 is a device that reads/writes the data of a portable storage medium such as a CD (Compact Disc) a DVD (Digital Versatile Disk), a USB (Universal Serial Bus) memory, etc. The network connecting device 507 is a network card, etc. for connecting to a LAN (Local Area Network) built in a data center, an intra-company system, or the like. The LAN is connected to a WAN (Wide Area Network) such as the Internet, a VPN (Virtual Private Network), etc. via a network equipment such as a router, etc. In this embodiment, the computer 500 communicates with the terminal 101 of the user 100 according to various types of communication protocols such as TCP/IP, etc. via the network connecting device 507.

The program (trouble handling program) for causing the computer 500 to function as the trouble handling system 200 according to this embodiment is stored on and distributed by a portable storage medium, for example. Moreover, the program can be downloaded and installed in the external storage device 505, or a portable storage medium mounted on the portable storage medium driving device 506 via a network such as the Internet, etc.

The above described trouble handling program installed in the external storage device 505, etc. is executed by the CPU 501 with an input operation performed by a system administrator, etc. from the input device 503 via a user interface screen displayed on the display device 504, for example. The CPU 501 executes the program, whereby the computer 500 implements the respective functions of the handling request processing unit 210, the handling method updating unit 220, the handling method recommending unit 230, the symptom integrating unit 240 and the handling method searching unit 260, which are included in the trouble handling system 200 illustrated in FIG. 5. The handling history management information 250 and the trouble handling knowledge 270 are created, for example, within the external storage device 505 or a portable storage medium mounted on the portable storage medium driving device 506.

[Operations]

The process executed by the trouble handling system 200 configured as described above is described below.

{Entire Flow}

Figure 7:
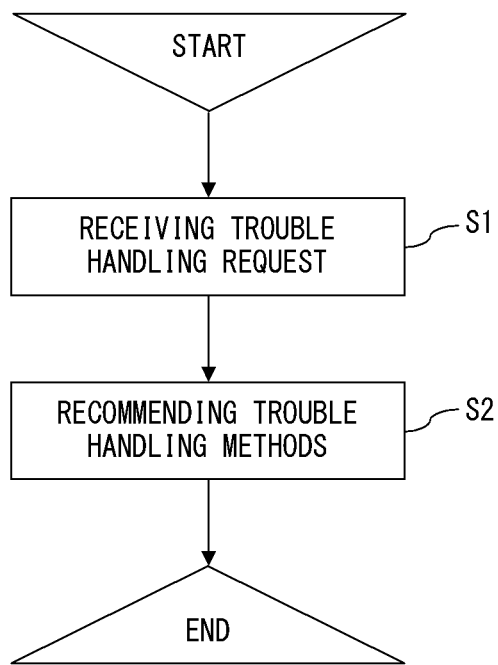
FIG. 7 is an entire flow of the trouble handling system.

FIG. 7 is the entire flow of the trouble handling system 200.

The trouble handling system 200 receives a trouble handling request from the terminal 101 of the user 100 (step S1). Then, the trouble handling system 200 returns recommended trouble handling methods to the terminal 101 of the user 100 (step S2).

{Process Executed by the Handling Request Processing Unit 210}

Figure 8:
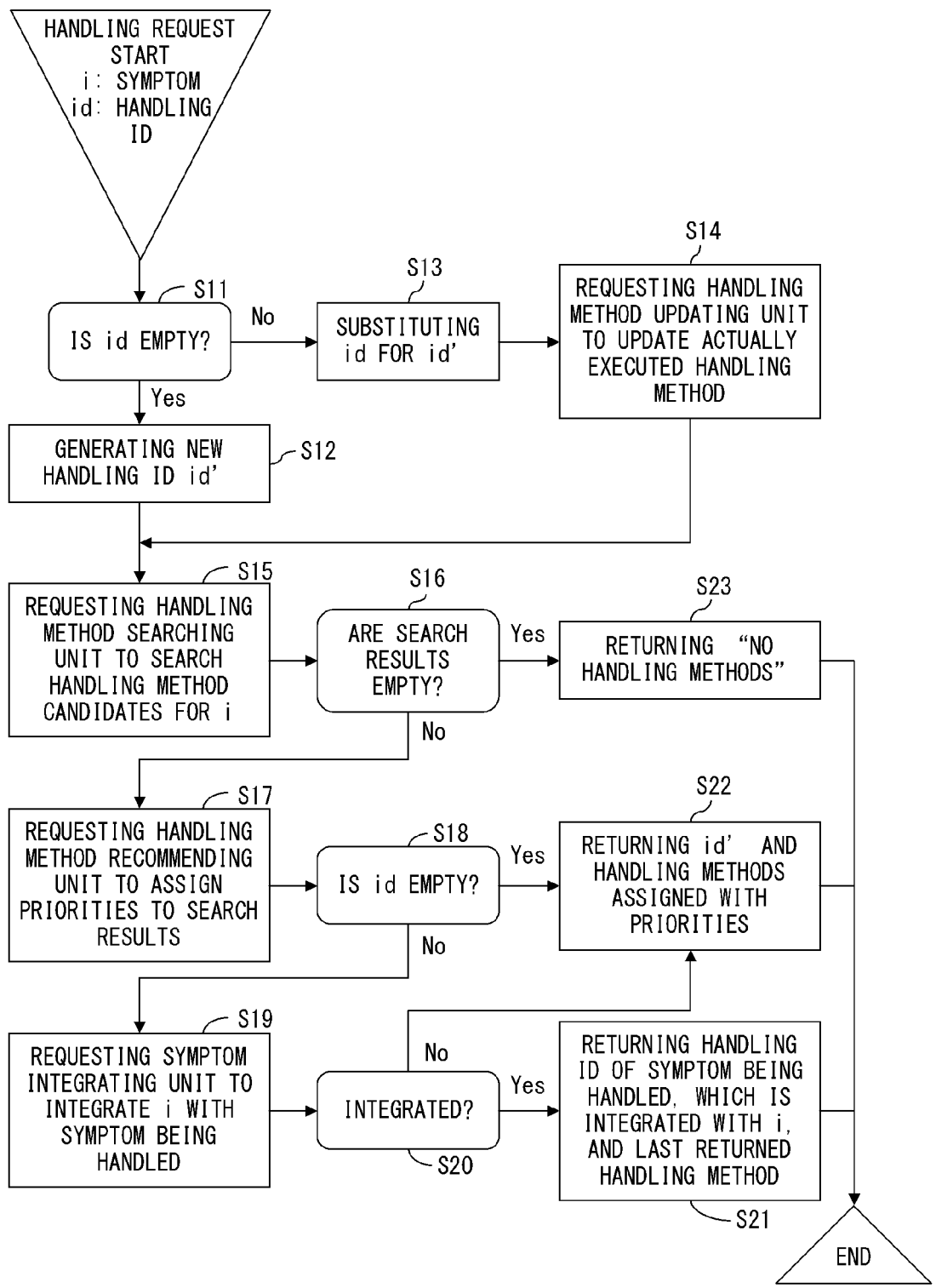
FIG. 8 is a flowchart illustrating a process executed by a handling request processing unit of FIG. 5.

FIG. 8 is a flowchart illustrating the process executed by the handling request processing unit 210 of FIG. 5. The handling request processing unit 210 executes the process represented by the flowchart of FIG. 8 each time it receives the handling request from the terminal 101 of the user 100.

Upon receipt of the handling request from the terminal 101 of the user 100, the handling request processing unit 210 starts the process of the flowchart represented by FIG. 8. The handling request includes parameters i and id. i is a parameter indicating a "symptom". id is a parameter indicating a "handling ID". The handling ID is an identifier assigned to a trouble currently being handled by the user 100, and unique in the system. Accordingly, the terminal 101 of the user 100 and the trouble handling system 200 can identify the trouble currently being handled by exchanging the handling ID. The symptom includes "a symptom (initial symptom and symptom proved by handling)", and "handling performed by the user 100".

The flowchart of FIG. 8 is described.

The handling request processing unit 210 initially determines whether or not id is empty (step S11). If id is empty ("YES" in step S11), the process goes to step S12. If id is not empty ("NO" in step S11), the process goes to step S13.

Since the handling ID is assigned by the trouble handling system 200, the handling ID (=id) that is initially received from the terminal 101 of the user 100 is empty. Accordingly, the determination made in step S11 is also a process for determining whether or not the user 100 transmits the initial symptom.

The handling request processing unit 210 generates a new handling ID (=id') in step S12. Then, the process goes to step S15. In the meantime, the handling request processing unit 210 substitutes id for the parameter id' (step S13). This process is a process for storing the handling ID (=id). Subsequent to the process of step S13, the handling request processing unit 210 requests the handling method updating unit 220 to update an actually executed handling method (step S14). Then, the process goes to step S15. The process of step S14 will be described in detail later. The "actually executed handling method" in step S14 is information included in the "symptom" received from the terminal 101 of the user 100.

The handling request processing unit 210 requests the handling method searching unit 260 to search handling methods corresponding to the symptom i in step S15. Upon receipt of the search request, the handling method searching unit 260 searches for the trouble handling knowledge 270 by using the symptom i as a key. As a result, the handling method searching unit 260 obtains the handling methods corresponding to the symptom i from the trouble handling knowledge 270. Then, the obtained search results are returned to the handling request processing unit 210.

Upon receipt of the search results from the handling method searching unit 260, the handling request processing unit 210 determines whether or not the search results are empty (step S16). If the search results are not empty ("NO" in step S16) the process goes to step S17. If the search results are empty ("YES" in step S16), the process goes to step S23.

The handling request processing unit 210 requests the handling method recommending unit 230 to assign priorities to the search results in step S17. The process of step S17 will be described in detail later. In the meantime, the handling request processing unit 210 returns "no handling methods" to the terminal 101 of the user 100 in step S23. Then, the process of this flowchart is terminated.

Subsequent to step S17, the handling request processing unit 210 determines whether or not id is empty (step S18). If id is not empty ("NO" in step S18), the process goes to step S19. If id is empty ("YES" in step S18), the process goes to step S22.

The process of this step S18 is a process for determining whether or not the current process is the initial trouble handling process, similar to step S11. The trouble handling system 200 according to this embodiment records the history of handling methods corresponding to each trouble to the handling history management information 250 for each trouble of the user 100. The process of step S19 can be executed only in response to the second handling request or later made from the terminal 101 of the user 100. Accordingly, by executing the process of step S18, the handling request processing unit 210 determines whether or not to branch the process to step S19.

The handling request processing unit 210 requests the symptom integrating unit 240 to integrate the symptom being handled (symptom handled so far) with the symptom i. The process of step S19 will be described in detail later. The symptom integrating unit 240 returns integration results to the handling request processing unit 210 upon termination of the process of step S19. Based on the integration results, the handling request processing unit 210 determines whether or not the symptom i is integrated in step S19 (step S20). If the symptom i is integrated ("YES" in step S20), the process goes to step S21. If the symptom i is not integrated ("NO" in step S20), the process goes to step S22.

The handling request processing unit 210 returns to the terminal 101 of the user 100 the handling ID of the "symptom being handled", which is integrated by the symptom integrating unit 240 with the symptom i, and the handling methods of the handling history linked last in the handling history information corresponding to the handling ID. Then, the process of this flowchart is terminated.

In the meantime, the handling request processing unit 210 returns to the terminal 101 of the user 100 id' (handling ID) and handling methods assigned with priorities, which are obtained from the handling method recommending unit 230, in step S22. Then, the process of this flowchart is terminated.

As described above, the handling request processing unit 210 receives the handling request from the terminal 101 of the user 100. Then, the handling request processing unit 210 returns to the terminal 101 handling methods for handling the symptom i received from the terminal 101 of the user 100 by assigning priorities to the handling methods while making the requests to the handling method searching unit 260, the handling method updating unit 220, the handling method recommending unit 230 and the symptom integrating unit 240. Additionally, the handling request processing unit 210 records the history information of handling methods, which correspond to each handling ID, in the handling history management information 250.

{Process Executed by the Handling Method Updating Unit 220}

Figure 9:
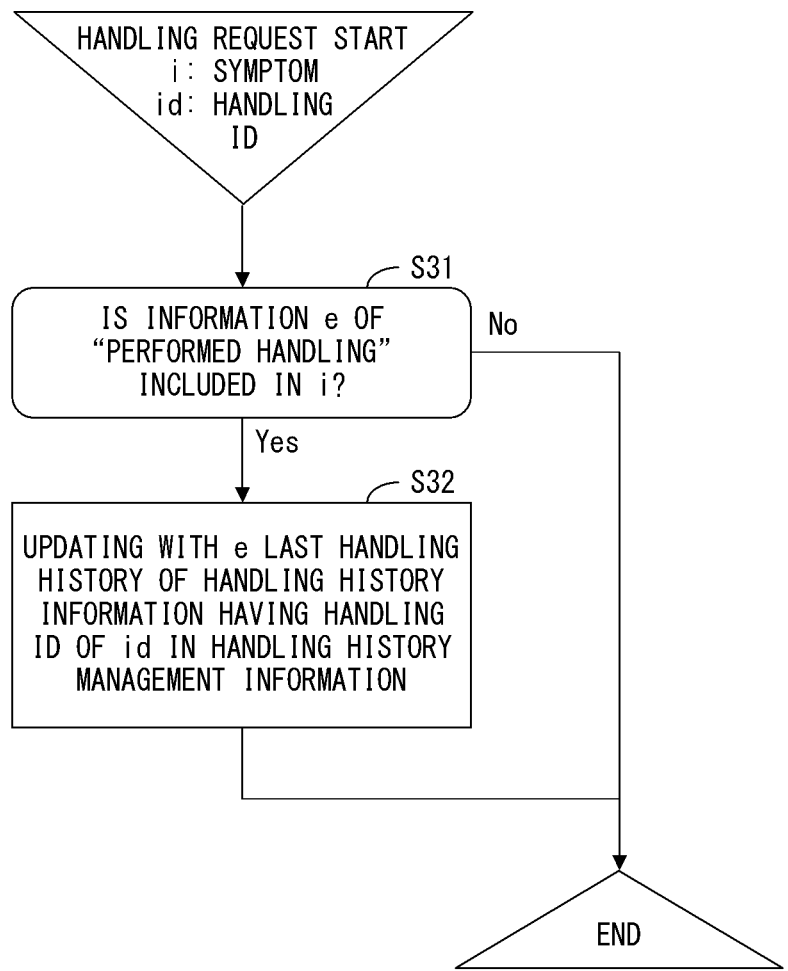
FIG. 9 is a flowchart illustrating a process executed by a handling method updating unit of FIG. 5.

FIG. 9 is a flowchart illustrating the process executed by the handling method updating unit 220 (corresponding to the step S14 of FIG. 5). The process of this flowchart corresponds to the process of step S14 of the flowchart illustrated in FIG. 8.

The handling method updating unit 220 receives the parameter i (symptom) and the parameter id (handling ID) from the handling request processing unit 210 as arguments, and starts the process of the flowchart illustrated in FIG. 8.

The handling method updating unit 220 initially determines whether or not information e of "performed handling" is included in i (step S31). The information e corresponds to the "examination of the number of processes of the server A" in the symptom 110-2 in the above described FIG. 4.

If the handling method updating unit 220 determines that the information e is included ("YES" in step S31), the process goes to step S32. If the handling method updating unit 220 determines that the information e is not included ("NO" in step S31), the process of this flowchart is terminated.

The handling method updating unit 220 updates the handling method of the last handling history in the handling history information having the handling ID of id, which is recorded in the handling history management information 250, with the information e (step S32). Then, the process of this flowchart is terminated.

As described above, the handling method updating unit 220 registers the handling method of the last handling history in the handling history information having the handling ID of id within the handling history management information 250.

Figure 10:
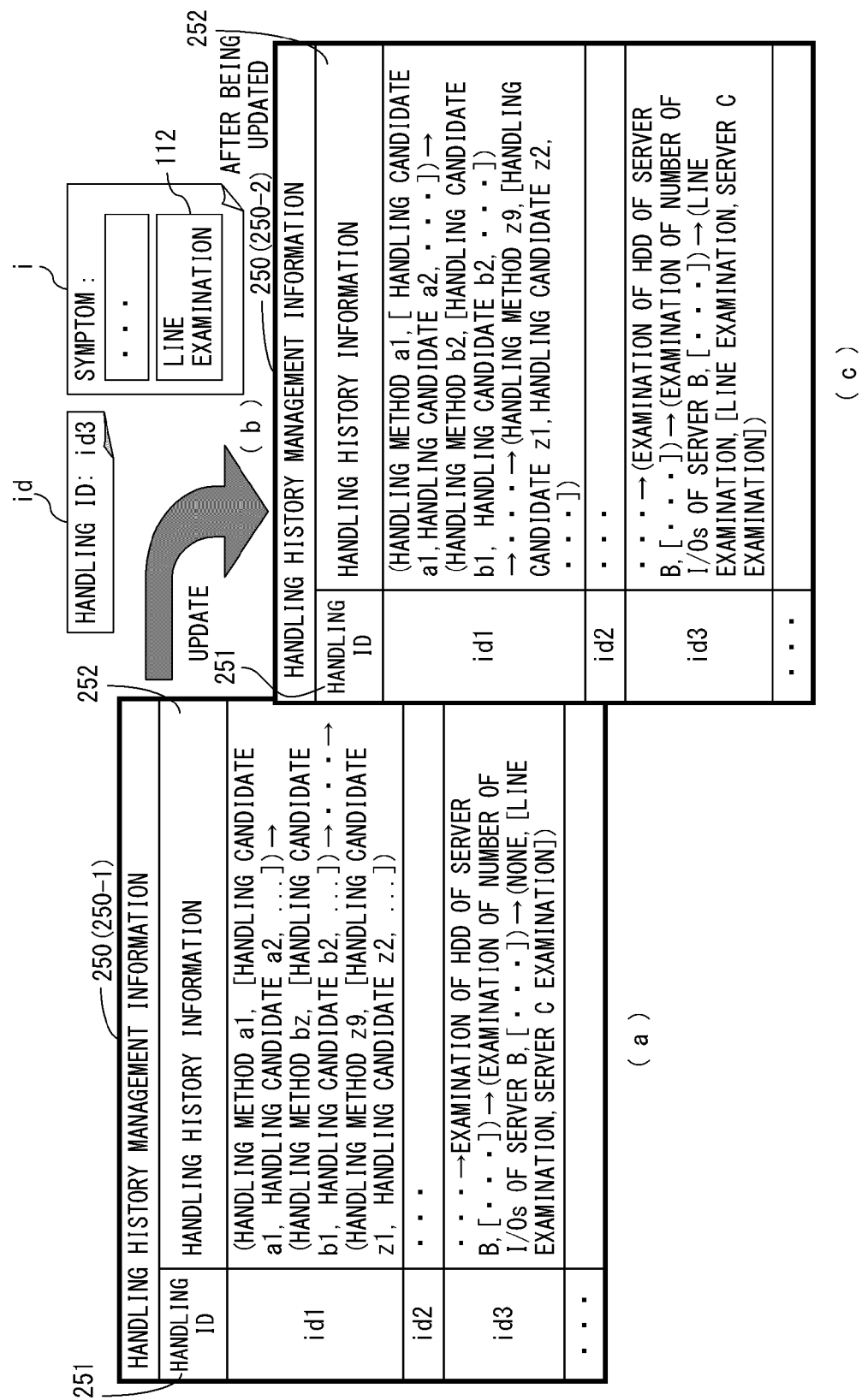
FIG. 10(a) illustrates handling history management information before being updated by the handling method updating unit.
FIG. 10(b) illustrates arguments received from the handling request processing unit.
FIG. 10(c) illustrates the handling history management information after being updated by the handling method updating unit.

FIG. 10 illustrates an example of the process represented by the flowchart of FIG. 9.

In FIG. 10, (a) and (c) respectively represent handling history management information 250 before being updated, and the handling history management information 250 after being updated. Moreover, (b) represents the arguments id (handling ID) and i (symptom), which the handling method updating unit 220 receives from the handling request processing unit 210.

As illustrated in FIGS. 10(a) and (c), the handling history management information 250 is a table for storing records each composed of a handling ID 251 and its corresponding handling history information 252 in each entry.

The handling history management information 250 stores records each composed of the pair of a handling ID 251 generated by the handling request processing unit 210 and its corresponding handling history information 252 in the order where handling IDs 251 are generated. The handling history information 252 stores handling methods actually executed by the user 100 in time series. Each handling history stored in the handling history information 252 has a data format of "handling method a, [handling candidate (handling method candidate) a1, handling candidate a2, . . . ]". Here, the handling method a is a handling (corresponding to the above described information e) actually performed by the user 100. The handling method a is one of the handling candidates within [ ]. Moreover, handling candidates are arranged in the order of priority within [ ] in each handling history. Handling candidates are hereinafter referred to as handling method candidates in this specification.

FIG. 10 illustrates an update example of the handling history information 252 having the handling ID 251 of id3. Since handling performed by the user 100 has not been received yet from the terminal 101 of the user 100, the handling method of the last handling history in the handling history management information 250-1 before being updated having the handling ID 251 of id3 is set to "none" as illustrated in FIG. 10(a). In this example, the handling request processing unit 210 returns to the terminal 101 of the user 100 "line examination" and "server C examination" as handling methods to be recommended. At this time, the priority of "line examination" is higher than that of "server C examination". In the meantime, the handling request processing unit 210 receives the symptom i along with handling id (handling ID=id 3) from the terminal 101 of the user 100 as illustrated in FIG. 10(b). Then, the handling request processing unit 210 requests the handling method updating unit 220 to update the handling method as described above.

The handling method updating unit 220 receives from the handling request processing unit 210 handling id (handling ID=id3), and "performed handling 112" (=line examination) included in the symptom i. Then, the handling method updating unit 220 updates the handling method of the last handling history in the handling history information 252 of records having the handling ID 251 of id3 within the handling history management information 250 from "none" to "line examination" (see FIG. 10(c)).

{Process Executed by the Handling Method Recommending Unit 230}

Figure 11:
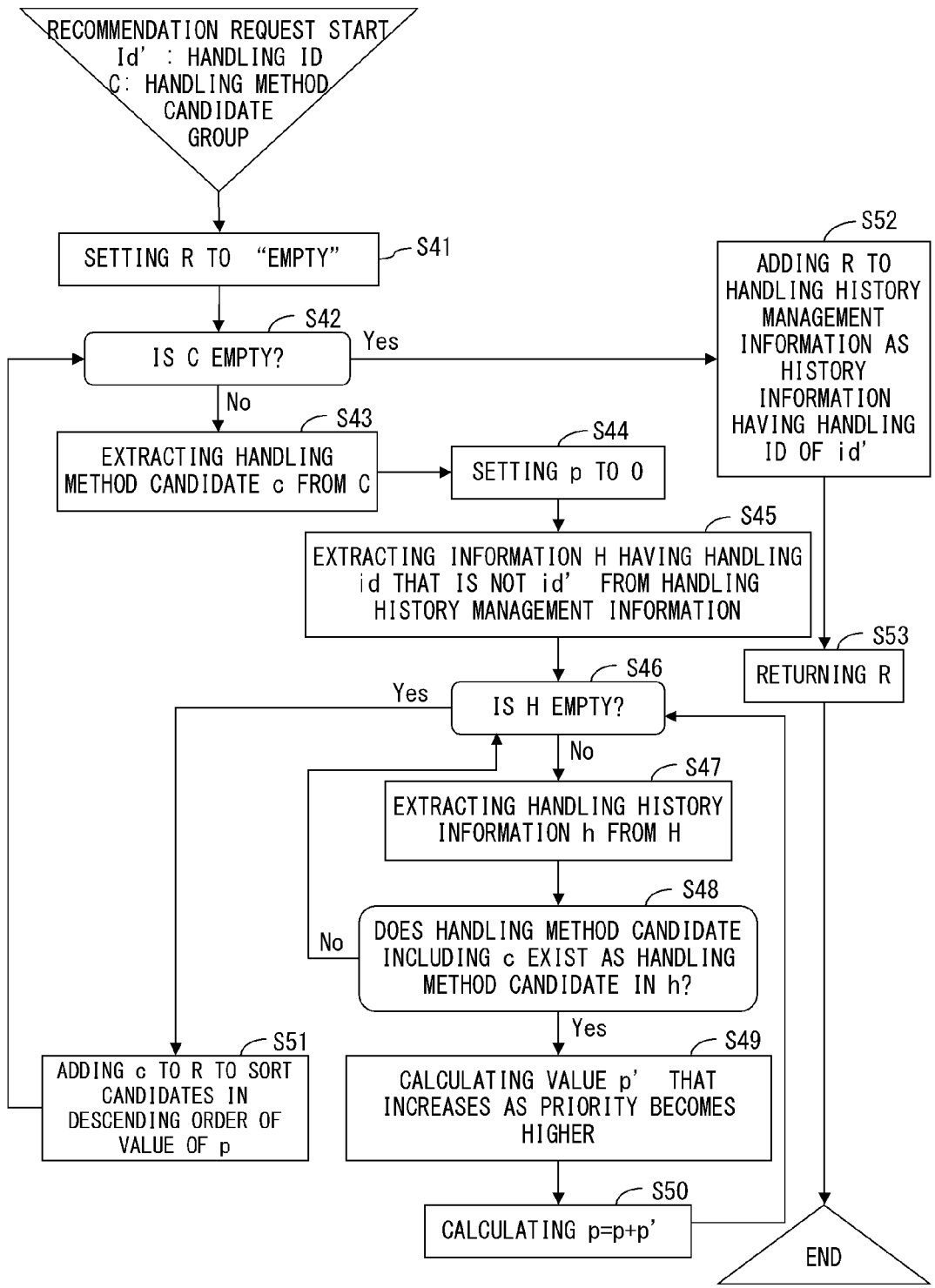
FIG. 11 is a flowchart illustrating a process (corresponding to step S17 of FIG. 5) executed by a handling method recommending unit of FIG. 5.

FIG. 11 is a flowchart illustrating the process (corresponding to step S17 of FIG. 8) executed by the handling method recommending unit 230.

In this process, the handling method recommending unit 230 receives from the handling request processing unit 210 id' (handling ID) and C (handling method candidate group) as arguments. Then, a register R is initially set to "empty" (step S41). Here, the register R is a register for storing a handling history. Next, whether or not the argument C is "empty" is determined (step S42). If the argument C is not empty ("NO" in step S42), the process goes to step S43. If the argument C is empty ("YES" in step S42), the process goes to step S52.

In step S43, one handling method candidate c is extracted from C. The handling method candidates c are extracted, for example, in the order of priority. Next, a variable p is initialized to "O" (step S44). Here, the variable p is a variable for storing the numerical value of a priority. Then, information H that is a set of all pieces of handling history information corresponding to handling IDs that are not the same as id' is extracted from the handling history management information 250 (step S45). Then, whether or not the information H is "empty" is determined (step S46). If the information H is not empty ("NO" in step S46), the process goes to step S47. If the information H is empty, the process goes to step S51.

In step S47, one piece of handling history information h (=handling history information 252) is extracted from the information H. In step S47, one piece of handling history information h starts to be sequentially extracted from the first row of the information H. Then, whether or not the same handling method candidate as the handling method candidate c exists in the handling history information h is determined (step S48). If the same handling method candidate as the handling method candidate c does not exist in the handling history information h ("NO" in step S48), the process goes back to step S46. If the same handling method candidate as the handling method candidate c exists in the handling history information h ("YES" in step S48), the process goes to step S49.

The handling method recommending unit 230 extracts the next piece of handling history information h from the information H in step S46 executed at the second time or later. Then, the processes of steps S47 and S48 are again executed.

As described above, the handling method recommending unit 230 examines whether or not the handling method candidate c exists in the handling history information h currently being processed. If the handling method candidate c exists ("YES" in step S48), the process goes to step S49.

The handling method recommending unit 230 calculates a value p' in step S49. The value p' is a value used to calculate the weight of the priority p, and set to a value that increases as the priority becomes higher. The calculation of the value p' will be described in detail later.

Next, p+p' is calculated, and a calculation result is substituted for p (step S50). Then, the process goes back to step S46.

As described above, the handling method recommending unit 230 repeats the processes of steps S46 to S50 until determining that the information H is empty in step S46 ("YES" in step S46). As a result, the priority p of each handling method candidate c in the handling method candidate group C is calculated.

If the handling method recommending unit 230 determines that the information H is empty ("YES" in step S46), the process goes to step S51.

In step S51, the handling method candidate c is added to R. This addition process is a process for sorting handling method candidates c in descending order of the value of p within R.

Upon termination of the process in step S51, the process goes back to step S42, in which the handling method recommending unit 230 determines whether or not the information C is empty. If the information C is not empty ("NO" in step S42), the handling method recommending unit 230 again executes the processes in steps S43 and later.

As described above, the handling method recommending unit 230 calculates the priorities p of all of handling method candidates in the handling method candidate group C by repeating the processes in steps S42 to S51. Then, the handling method candidates are arranged in descending order of the priority p within R.

If the handling method recommending unit 230 determines that C is empty, namely, all the handling method candidates c are extracted from C ("YES" in step S42), the process goes to step S52.

In step S52, the handling method recommending unit 230 adds R to the handling history management information 250 as handling history information having the handling ID of id'. This addition is made, for example, by registering the above described R to the end of the handling history management information 250. Then, R is returned to the handling request processing unit 210 (step S53), and the process of this flowchart is terminated.

As described above, handling method candidates are arranged in the order of priority within R. Accordingly, the handling method candidates arranged in the order of priority are transmitted from the handling method recommending unit 230 to the handling request processing unit 210. In the process flow represented by FIG. 11, H is empty if id is empty. Therefore, the loop process of steps S42 through S46 to S51 to S42 is executed by the number of times equal to the number of handling method candidates c. Accordingly, when the initial handling request is received from the terminal 101 of the user 100, the priorities p of all handling method candidates c corresponding to the initial symptom 111-1 of the symptom i are set to 0. Therefore, the priorities p of all the handling method candidates (handling request) corresponding to the initial symptom 111-1 become equal. Therefore, search results of the handling method searching unit 260 are set unchanged in R.

{Process Executed by the Handling Method Recommending Unit 230}

(1) Method for Calculating the Priority p in Consideration of all Handlings

Figure 12:
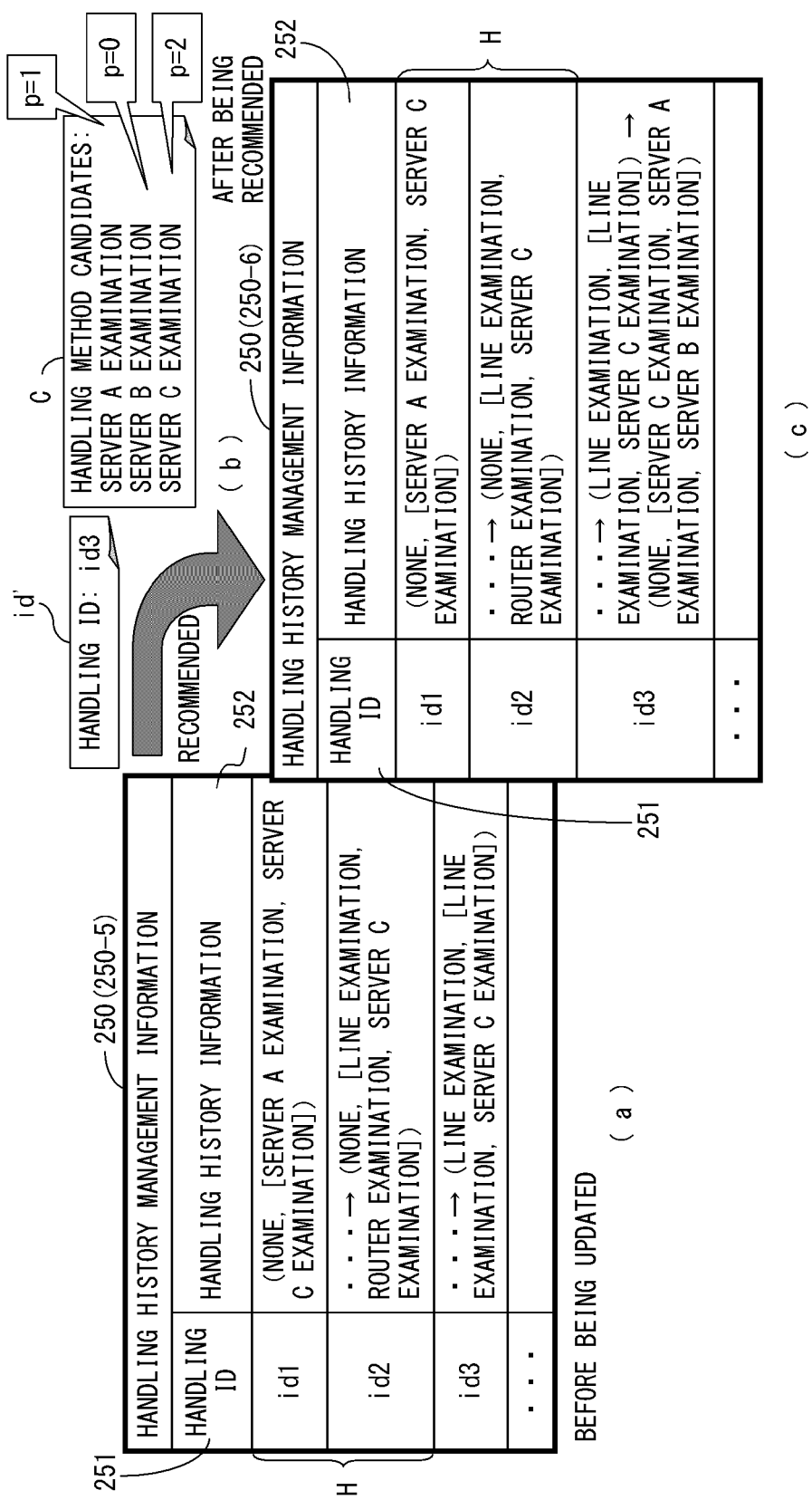
FIG. 12 is an explanatory view of a method for recommending a handling method effective also to another symptom being handled with high priority.

FIG. 12 illustrates an example of the process executed by the handling method recommending unit 230. With the method illustrated in FIG. 12, a handling method effective also to other symptoms being handled is recommended with high priority. In this case, a handling candidate (handling method candidate) which is included in larger numbers in handling history information 252 corresponding to the other symptoms being handled within the handling history management information 250, may be obtained by being assigned with a higher priority p.

FIG. 12(a) illustrates contents of handling history management information 250 (250-5) before the handling request processing unit 210 invokes the handling method recommending unit 230. Namely, the handling history management information 250-5 indicates the contents of the handling history management information before being updated by the handling method recommending unit 230. In the handling history management information 250-5, three pieces of handling history information 252 (handling history information respectively having the handling ID 251 of id1 to id3) being handled are currently registered.

Here, assume that the handling method recommending unit 230 receives id' (handling ID=id3), and the handling method candidate group C (server A examination, server B examination, server C examination) as arguments from the handling request processing unit 210 as illustrated in FIG. 12(b). In this case, the above described information H extracted from the handling history information 252 in step S45 of the above described flowchart illustrated in FIG. 11 is a set of the handling history information 252 having the handling ID of id1, and the handling history information 252 having the handling ID of id2. In this example, the appearance frequency as a priority p within H is calculated for each of the handling method candidates (server A examination, server B examination and server C examination in this case) within the handling method candidate group C. Namely, the process in step S49 of FIG. 11 is a process for setting p' to 1 if the handling method candidate c is included in the handling history information h. Therefore, p of "server A examination", p of "server B examination" and p of "server C examination" respectively result in 1, 0 and 2 as illustrated in FIG. 12(b). Accordingly, the server C examination, the server A examination and the server B examination are arranged in this order if "server A examination", "server B examination" and "server C examination" are arranged in descending order of the priority p. The handling method recommending unit 230 adds/records this arrangement information R to the handling history management information 250 by making R correspond to the handling ID (=id3) (corresponding to the process in step S52 of FIG. 11). As a result, the handling history of (none, [server C examination, server A examination, server B examination]) is added in the handling history information 252 having the handling ID 251 of id3 within the handling history information 252 as illustrated in FIG. 12(c). Moreover, the handling method recommending unit 230 returns the above described R to the handling request processing unit 210 (corresponding to the process in step S53 of FIG. 11).

(2) Method for Calculating the Priority p in Consideration of One Handling 2.1) method for setting the priority p of a handling candidate (handling method candidate), which is included in larger numbers in handling history information 252 having the same handling ID 251, to a higher value (however, the priority of a handling candidate included in a larger number of handlings is set to a higher value, namely, preference is given to the above described (1)).

Figure 13:
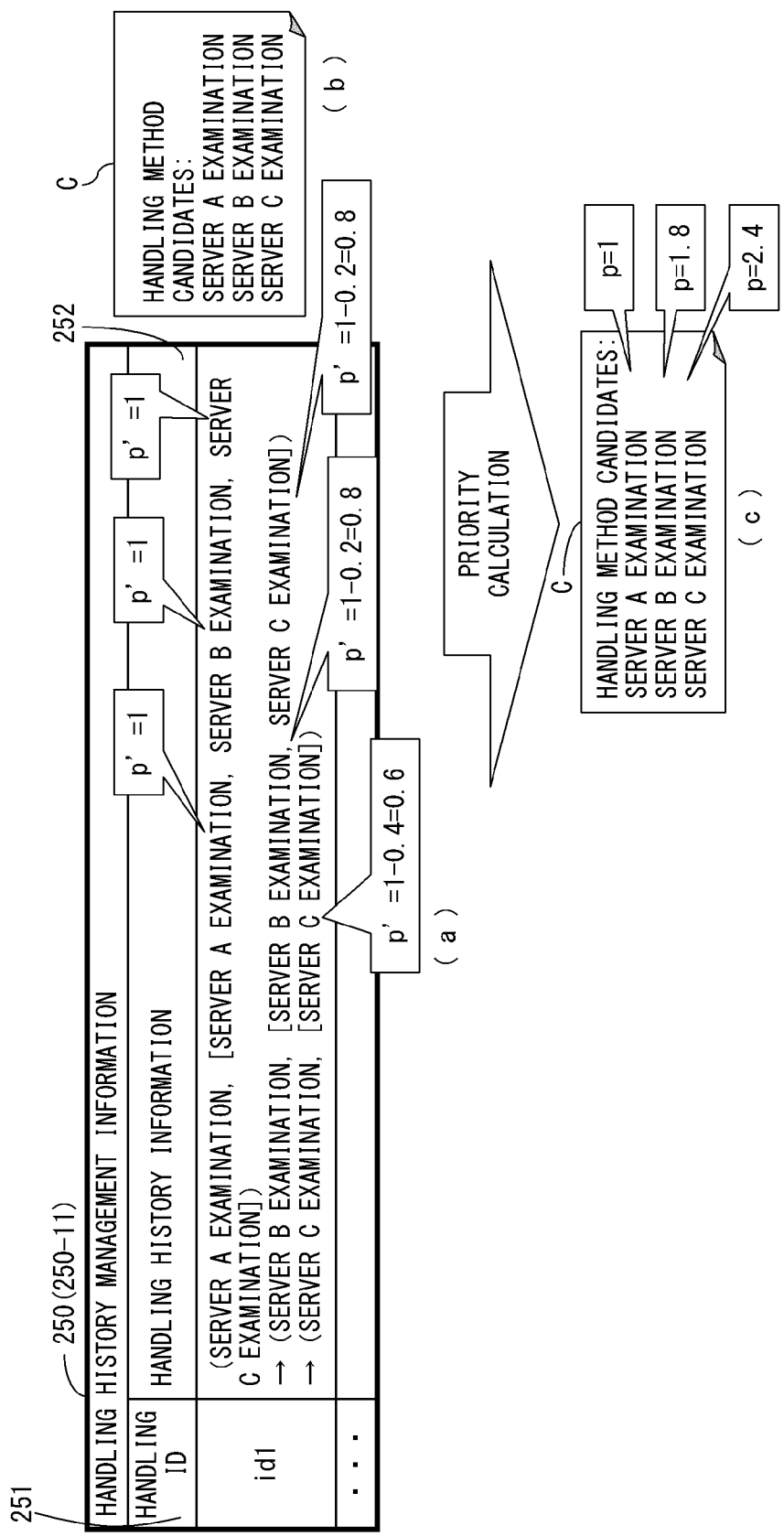
FIG. 13 is an explanatory view (No. 1) of a method for calculating a priority in consideration of one handling.

FIG. 13 illustrates this method.

With the method illustrated in FIG. 13, p' of a handling candidate included in a handling method executed later is set to a value that decreases in decrements of 0.2 if the same handling candidate is included in a plurality of handling methods.

Here, handling history information 252 having the handling ID 251 of id1 within handling history management information 250-11 as illustrated in FIG. 13(a) is exemplified. In this handling history information 252, it is recorded that handlings are performed in the order of "server A examination", "server B examination" and "server C examination".

Additionally, it is recorded for each handling that handling candidates of the server A examination are "server A examination", "server B examination" and "server C examination". Additionally, it is recorded that handling candidates of the server B examination are "server B examination" and "server C examination". Furthermore, it is recorded that a handling candidate of the server C examination is "server C examination". In this example, the handling method candidate group C includes "server A examination", "server B examination" and "server C examination" as illustrated in FIG. 13(b).

Accordingly, in this example, the priority p is calculated for each of the handling methods such as the server A examination, the server B examination and the server C examination in the handling history information 252 having the handling ID 251 of id1. Based on the above described weight assigning method, the values p' of "server A examination", "server B examination" and "server C examination" in the respective handling methods such as the server A examination, the server B examination and the server C examination within the handling history information 252 having the handling ID 251 of id1 are set to the values illustrated in FIG. 13(a). As a result, the values of the priorities p of the three handling method candidates in the handling method candidate group C are finally calculated as follows.

p of the server A examination=1 p of the server B examination=1.8 p of the server C examination=2.4

Accordingly, the above described three handling method candidates are assigned with priorities in the order of the server C examination, the server B examination and the server A examination. The server C examination, the server B examination and the server A examination, which are assigned with the priorities in this way, are stored in the variable R illustrated in FIG. 11, and the variable R is returned from the handling method recommending unit 230 to the handling request processing unit 210.

2.2) Method for Setting p' of a Handling Candidate Included in More Recent Handling Candidates to a Higher Value FIG. 14 illustrates a method for calculating the priority p of each handling method candidate within the handling method candidate group C by setting p' of a handling candidate, which is included in more recent handling candidates within the handling history information 252, to a higher value.

FIG. 14(a) illustrates handling history management information 250 (250-13) where handling history information 252, for which the priority p of each handling method candidate in the handling method candidate group C illustrated in FIG. 14(b) is to be calculated, is recorded. In this example, the reference value of p' is set to 1 and the weight of "⅓" is added to the reference value for a handling candidate of the first handling. For a handling candidate of the second handling, the weight of "⅔" is added to the reference value. For a handling candidate of the third handling, the weight of "3/3" is added to the reference value. As a result, p' of "server A examination" that is the handling candidate of the first handling results in "1+⅓", p' of the server B examination that is the handling candidate of the second handling results in "1+⅔", and p' of the server C examination that is the handling candidate of the third handling results in "1+3/3" as illustrated in FIG. 14(a).

Accordingly, the priority p of the server A examination, the priority p of the server B examination, and the priority p of the server C examination in the handling method candidate group C respectively result in 1.3, 1.7 and 2 as illustrated in FIG. 14(c). In this case, the priority p is calculated by being rounded off to the first decimal place.

Figure 15:
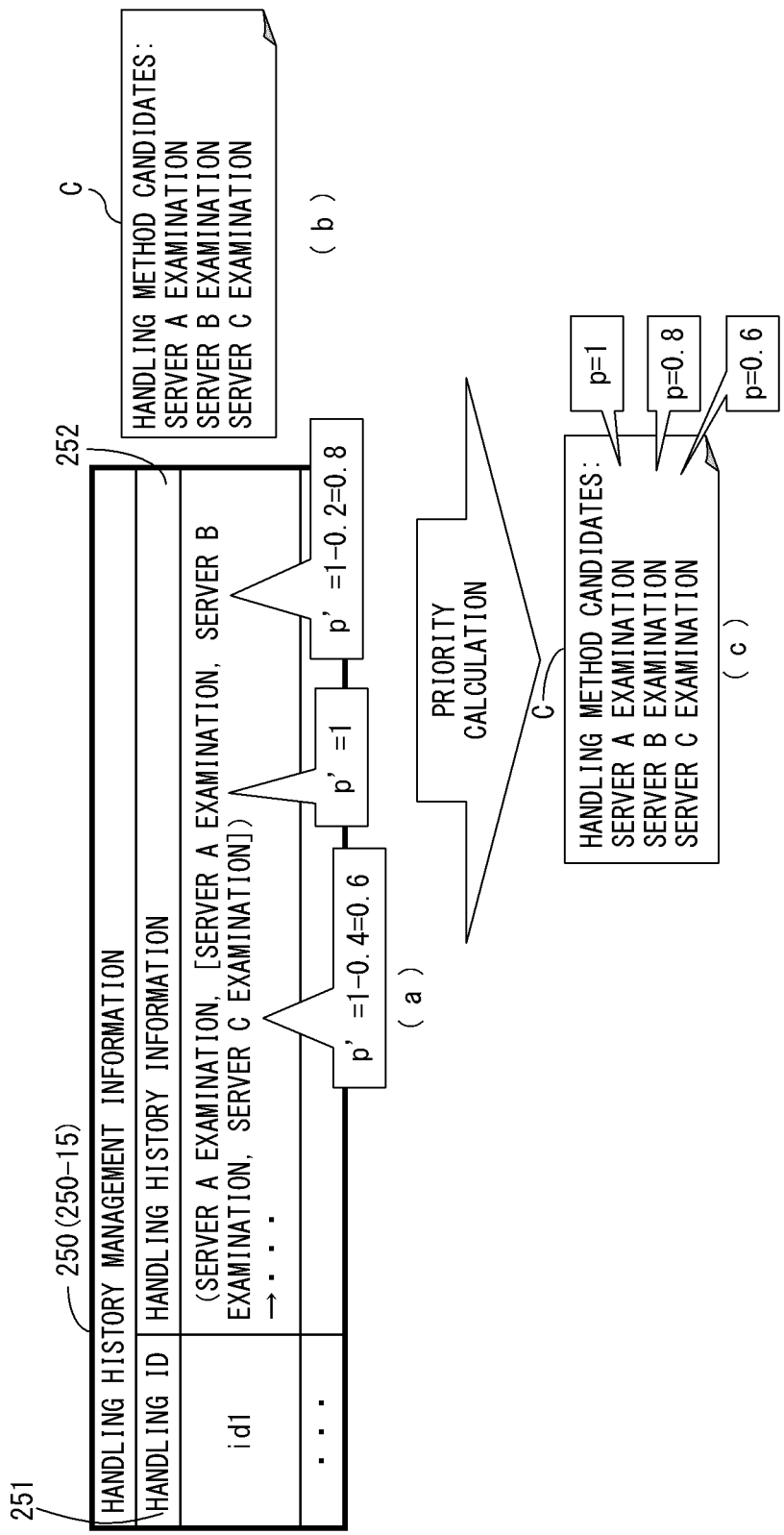
FIG. 15 is an explanatory view (No. 3) of a method for calculating a priority in consideration of one handling.

2.3) Method for Setting p' of a Handling Candidate, which is Originally Assigned with a Higher Priority, to a Higher Value FIG. 15 is an explanatory view of a method for calculating the priority of a handling method candidate by setting p' of a handling candidate, which is assigned with a higher priority within the handling history management information 250, to a higher value.

Assume that information of (server A examination, [server A examination, server B examination, server C examination]) is recorded to the handling history information 252 corresponding to the handling ID of id1 in the handling history management information 250 (250-15) as illustrated in FIG. 15(a). Also assume that the handling method candidate group C includes "server A examination", "server B examination", and "server C examination" as illustrated in FIG. 15(b).

In this case, p' of the server A examination, p' of the server B examination, and p' of the server C examination are respectively set to 1, 0.8 (1−0.2), and 0.6 (1−0.4) as the handling candidates within the handling history information 252 having the handling ID of id1 in the handling history management information 250 (see FIG. 15(a)). Namely, in this case, p' of each handling method candidate is set to a value that decreases in decrements of 0.2 each time the priority becomes low.

Accordingly, in this example, the calculation results of the priorities p of the respective handling method candidates in the handling method candidate group C are the server A examination=1, the server B examination=0.8, and the server C examination=0.6 as illustrated in FIG. 15(c).

Figure 16:
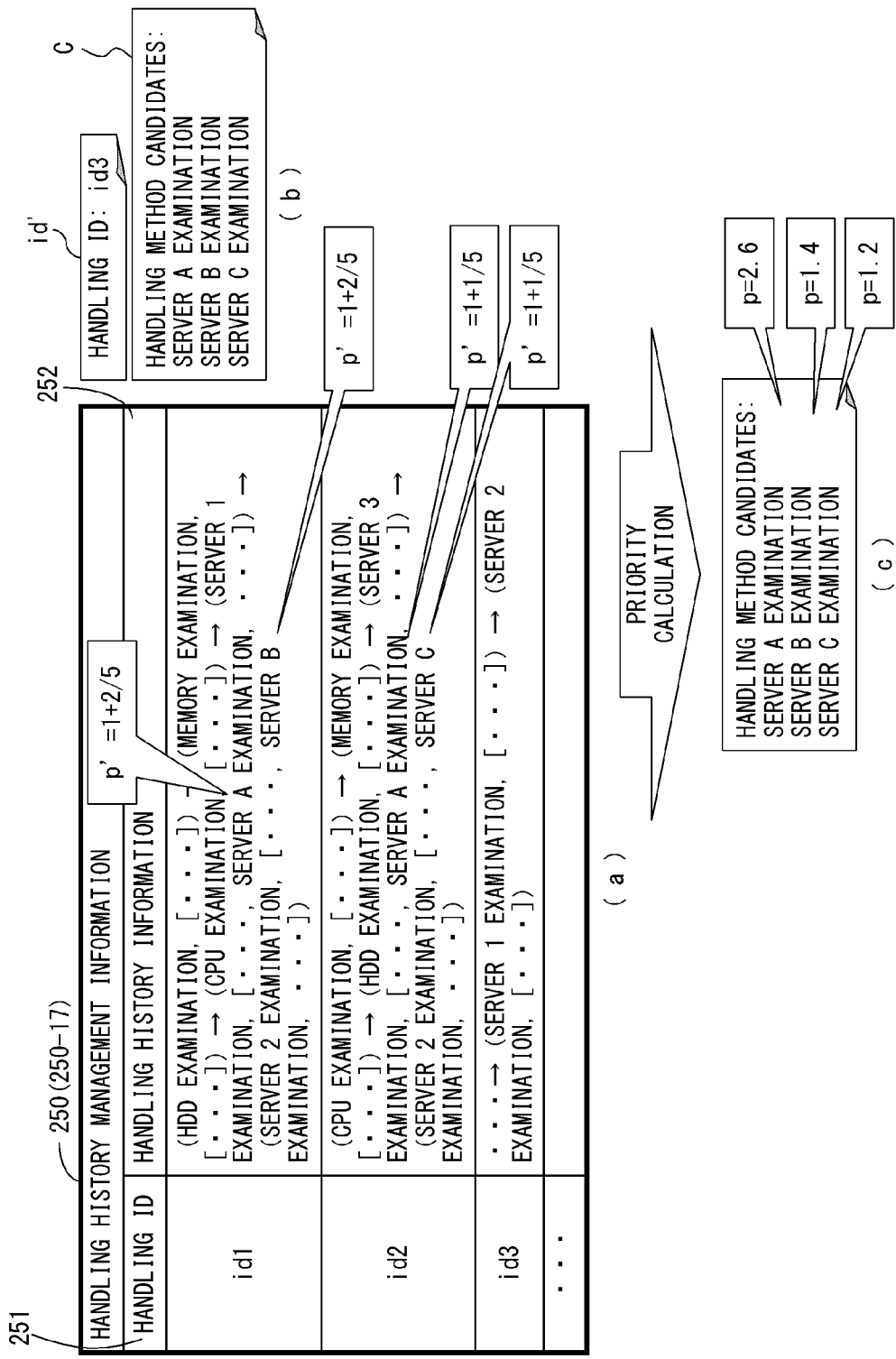
FIG. 16 is an explanatory view (No. 4) of a method for calculating a priority in consideration of one handling.

2.4) Method for Setting p' of a Handling Candidate, which is Included in a Handling Having a Lot of Common Portions to the Handling in Question, to a Higher Value Although the Candidate is not Sufficient to be Collected FIG. 16 is an explanatory view of a method for setting p' of a handling candidate, which is included in a handling having a lot of common portions to the handling in question within the handling history management information 250, to a higher value.

Assume that id' is "handling ID:3", and the handling method candidate group C is {server A examination, server B examination, server C examination} as arguments passed from the handling request processing unit 210 to the handling method recommending unit 230 as illustrated in FIG. 16(b).

At this time, assume that the recorded contents of handling history management information 250-17 are those illustrated in FIG. 16(a). As illustrated in FIG. 16(a), "server 1 examination" and "server 2 examination" are recorded as handling methods in the handling history information 252 having the handling ID 251 of id3 within the handling history management information 250. For the two handling methods "server 1 examination" and "server 2 examination", the handling history information 252 having the handling ID 251 of id1 and the handling history information 252 having the handling ID 251 of id2 in the handling history management information 250-17 are examined. As a result, both of "server 1 examination" and "server 2 examination" are recorded as handling methods in the handling history information 252 having the handling ID 251 of id1. In the meantime, only "server 2 examination" is recorded in the handling history information 252 having the handling ID 251 of id2.

Accordingly, in this case, the weight of p' of a handling candidate within the handling history information 252 having the handling ID 251 of id1 is set to a higher value than that of a handling candidate within the handling history information 252 having the handling ID 251 of id2. In the example illustrated in FIG. 16(a), the weight of each handling candidate corresponding to the handling ID 251 of id1, and the weight of each handling candidate corresponding to the handling ID 251 of id2 are set to "⅔" and "⅓", respectively. Specifically, p' of "server A examination" and p' of "server B examination", which correspond to the handling ID 251 of id1, are set to "1+⅔". In contrast, p' of "server A examination" and p' of "server C examination", which correspond to the handling ID 251 of id2, are set to "1+⅓".

If the priorities p of the respective handling method candidates in the handling method candidate group C are calculated based on the above described settings, p of the server A examination=2.6, p of the server B examination=1.4, and p of the server C examination=1.2 are obtained as calculation results as illustrated in FIG. 16(c).

The above described methods may be combined to set p'.

{Process Executed by the Symptom Integrating Unit 240}

Figure 17:
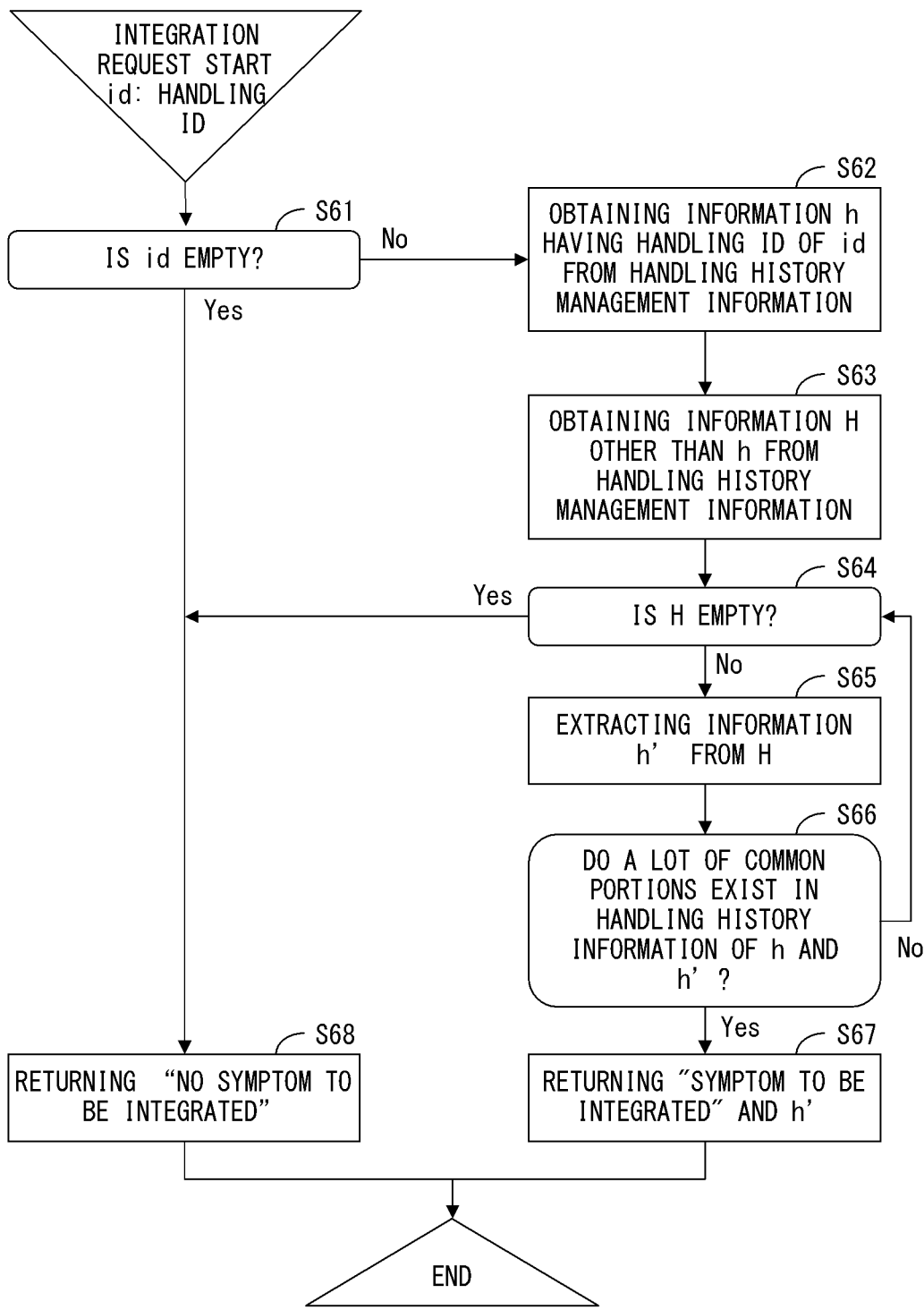
FIG. 17 is a flowchart illustrating a process executed by a symptom integrating unit.

FIG. 17 is a flowchart illustrating the process executed by the symptom integrating unit 240. This process corresponds to the process of step S19 illustrated in FIG. 8.

The symptom integrating unit 240 receives the parameter id (handling ID) from the handling request processing unit 210, and starts the process represented by the flowchart of FIG. 17.

The symptom integrating unit 240 initially determines whether or not id is empty (step S61). If id is not empty ("NO" in step S61) the process goes to step S62. If id is empty ("YES" in step S61) the process goes to step S68. The determination made in step S61 is similar to the process of step S11 represented by the above described flowchart of FIG. 8.

The symptom integrating unit 240 extracts information h having the handling ID 251 of id from the handling history management information 250 in step S62. This information h is information composed of a pair of the handling ID 251 (=id) and its corresponding handling history information 252. Next, information H other than h is obtained from the handling history management information 250 (step S63), and whether or not the information H is empty is determined (step S64). If the information H is not empty ("NO" in step S64), the process goes to step S65. If the information H is empty ("YES" in step S64) the process goes to step S68.

The symptom integrating unit 240 extracts the first h' from the information H in step S65. This h' is information composed of a pair of the handling ID 251 and its corresponding handling history information 252, similar to the above described h. Then, a comparison is made between the handling history information 252 of h and the handling history information 252 of h', and whether or not they have a lot of common portions is determined (step S66). If they have a lot of common portions ("YES" in step S66), the process goes to step S67. If they don't have a lot of common portions ("NO" in step S66), the process goes back to step S64. The process of step S66 will be described in detail later.

As described above, the symptom integrating unit 240 repeats the processes of steps S64 to S66 until determining that H is empty, namely, h' to be extracted from H does not exist any more ("YES" in step S64), or determining that the handling history information 252 of h and the handling history information 252 of h' have a lot of common portions ("YES" in step S66).

The symptom integrating unit 240 integrates h with h' in step S67, and returns the status of "symptom to be integrated exists" and h' to the handling request processing unit 210. Then, the process of this flowchart is terminated.

The symptom integrating unit 240 returns the status of "no symptom to be integrated" to the handling request processing unit 210 in step S68. Then, the process of this flowchart is terminated.

Figure 18:
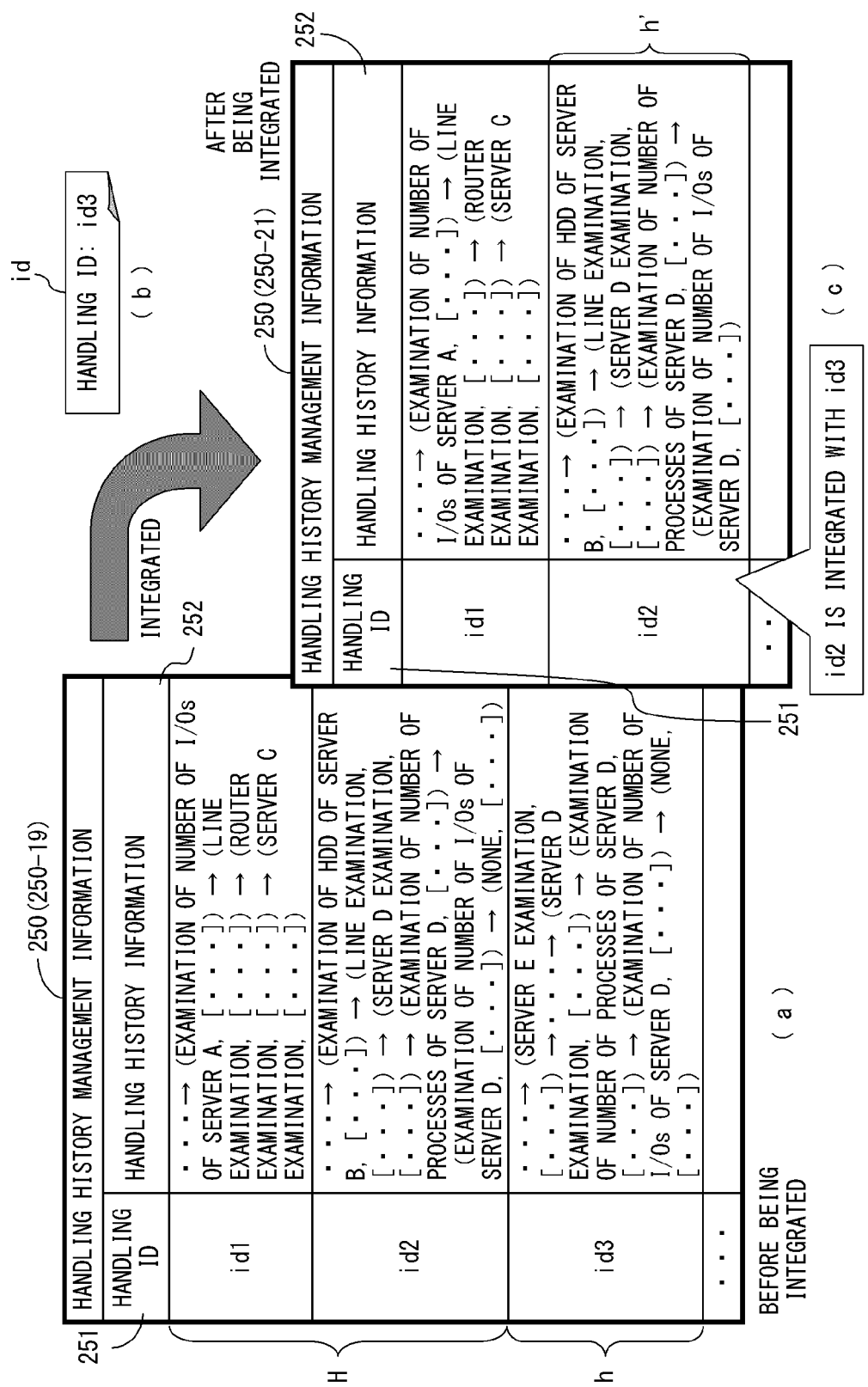
FIG. 18 illustrates a specific example of the process represented by the flowchart of FIG. 17.
Figure 20:
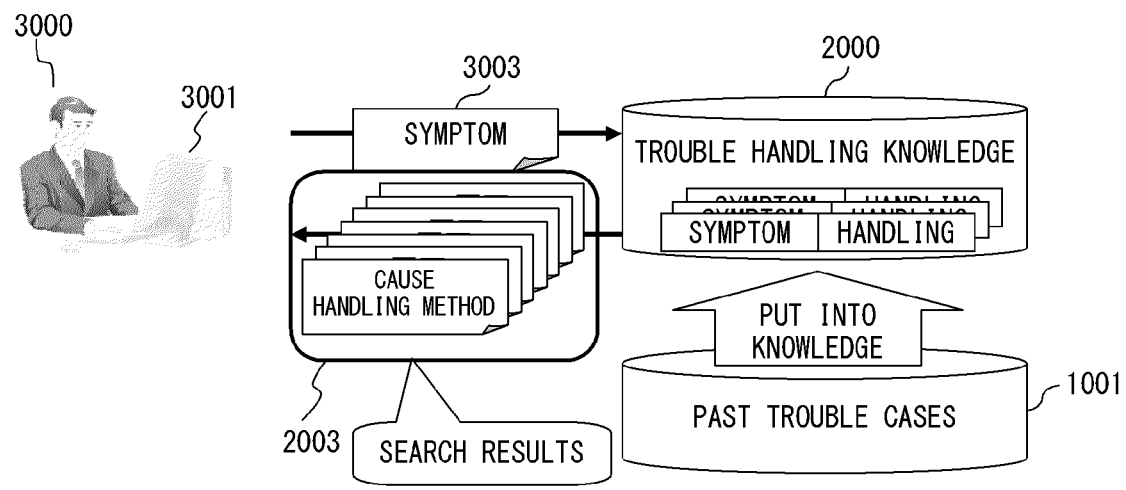
FIG. 20 is a schematic diagram illustrating a conventional trouble handling method.

FIG. 18 illustrates a specific example of the above described process of the flowchart illustrated in FIG. 17.

FIG. 18(*a*) illustrates handling history management information 250 (250-19) before being integrated by the symptom integrating unit 240. FIG. 18(*b*) illustrates the argument id that the symptom integrating unit 240 receives from the handling request processing unit 210. FIG. 18(*c*) illustrates the handling history management information 250 (250-21) after being integrated by the symptom integrating unit 240.

In this example, the symptom integrating unit 240 receives the handling ID of id3 as the argument id from the handling request processing unit 210 as illustrated in FIG. 18(*b*). Accordingly, information h having the handling ID 251 of id3 in the handling history management information 250 (250-19) illustrated in FIG. 18(*a*) is to be integrated. In this example, the information H other than h is composed of information having the handling ID 251 of id1 and information having the handling ID 251 of id2 in the handling history management information 250-19. Accordingly, the information h' having the handling ID 251 of id1, and the information h' having the handling ID 251 of id2 are sequentially extracted from the information H. Then, a comparison is made between the contents of the respective handling history information 252 of the information h' and those of the handling history information 252 of the information h. Then, information h' having handling history information 252 that has a lot of common portions to the handling history information 252 of the information h is searched. If the information h' is found, the process for integrating the information h' with the information h is executed.

In this example, the handling history information 252 having a lot of common portions to the handling history information 252 of the information h is the handling history information 252 of the information h' having the handling ID 251 of id2 as illustrated in FIG. 18(*a*). Specifically, "server D examination", "examination of the number of processes of the server D", "examination of the number of I/Os of the server D", and "none" are common in the respective handling methods within the respective handling history information 252. Accordingly, in this example, the information h having the handling ID 251 of id3 is integrated with the information h' having the handling ID of id2 as illustrated in FIG. 18(*c*).

{Method for Determining that the Handling History Information 252 of the Information h and the Handling History Information 252 of the Information h' Have a Lot of Common Portions}

FIG. 19 illustrates an example of the determining method executed in step S66 of the flowchart illustrated in FIG. 17. In FIG. 19, "history 1" and "history 2" respectively indicate the handling history information 252 of the information h, and the handling history information 252 of the information h'. Additionally, A, B, C, D and E indicate handling methods within the handling history information 252. Moreover, A→B→C→D→E indicates that the handling methods are executed in the order of A, B, C, D and E.

FIG. 19(*a*) illustrates an example where a lot of common portions are determined to exist if the ratio of common portions to the entire handling history information 252 is equal to or larger than a certain value. In this example, the certain value is set to 50 percent. In the case of this example, the handling methods C, D and E are common in the history 1 and the history 2. Therefore, the ratio of the common portions is 60 percent, which exceeds the certain value (=50 percent). Accordingly, the history 1 and the history 2 are determined to have a lot of common portions.

FIG. 19(*b*) illustrates an example where a lot of common portions are determined to exist if the handling history (handling method history) of one piece of handling history information 252 matches a forward portion of the handling history of another piece of handling history information 252. In this example, the handling history "A→B→C" of the history 2 matches the forward portion of the handling history "A→B→C→D→E" of the history 1. Accordingly, in this case, the ratio of the forward match portion is 60 percent. Since the reference value (certain value) of the forward match portion is set to 50 percent in this example, the handling histories of the history 1 and the history 2 are determined to have a lot of common portions.

FIG. 19(*c*) illustrates an example where a lot of common portions are determined to exist if the handling history (handling method history) of one piece of handling history information 252 is included in another piece of handling history information 252. In this example, the handling history of the history 1 is "A→B→C→D→E". In contrast, the handling history of the history 2 is "B→C→D". In this case, the handling history of the history 2 is included in the history 1, and the ratio of the handling history of the history 2 to the entire handling history of the history 1 is 60 percent. Since the reference value (certain value) of the inclusion ratio is set to 50 percent in this example, a lot of common portions are determined to exist.

FIG. 19(*d*) illustrates an example where a lot of common portions are determined to exist if the handling history of one piece of handling history information 252 matches a backward portion of the handling history of another piece of handling history information 252. In this example, the handling history of the history 1 is "A→B→C→D→E". In contrast, the handling history of the history 2 is "C→D→E". In this case, the handling history of the history 2 matches the backward portion of the history 1, and the ratio of the backward match portion of the history 2 to the entire handling history of the history 1 is 60 percent. Since the reference value (certain value) of the ratio of the backward match portion to the entire handling history is set to 50 percent in this example, a lot of common portions are determined to exist.

In all of the above described examples of FIGS. 19(*a*) to 19(*d*), sequential handling methods are targeted as common portions. However, the embodiment according to the present invention is not limited to this implementation. For example, even if the handling method E is executed between the handling methods A and B as in "A→E→B→C", this may be regarded as a portion common to "A→B→C".

This embodiment automatically integrates symptoms resulting from the same cause during handling. This can reduce manpower required for the integration. Moreover, a handling method effective also to other symptoms is recommended with higher priority in consideration of the other symptoms simultaneously in progress. As a result, a total handling time required for a trouble that causes a plurality of symptoms can be reduced. Accordingly, the disclosed program and method can efficiently handle a trouble that causes a plurality of symptoms in an information system.

The Embodiment according to the present invention is not limited to the above described embodiments, and can be modified and implemented in a variety of ways within the scope that does not depart from the spirit of the present invention. For example, the method for calculating the priority p is not limited to the above described embodiments. Also the method for determining that a lot of common portions exist is not limited to the methods referred to in the above described embodiments.

All examples and conditional language recited herein are intended for pedagogical purposes to aid the reader in understanding the invention and the concepts contributed by the inventor to furthering the art, and are not to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for putting trouble handling cases occurring in the past in an information system into knowledge data, and for recommending a handling method using a trouble handling knowledge obtained by putting the trouble handling cases into the knowledge data, and a symptom of a trouble when the trouble occurs, the process comprising:

obtaining candidates of a handling method for a trouble requested to be handled by searching the trouble handling knowledge;

recording to a storing unit a history of handling methods executed for each symptom and a history of candidates of the handling method at the time of the execution as handling history information;

assigning priorities to the candidates of the handling method obtained by the obtaining step in the handling history information recorded in the storing unit;

returning to a handling request source the handling method for the trouble requested to be handled after assigning a priority to the handling method using priority assignment information obtained by the assigning; and integrating, into one, handling history information having a plurality of common portions in the handling history information recorded in the handling history management information, wherein:

the assigning step assigns a higher priority to a handling method candidate effective also as to other symptoms being handled, as an appearance frequency of the candidates of the handling method in handling history information of the other symptoms being handled becomes higher, the appearance frequency recognized by referring to handling history information of the other symptoms being handled, and the integrating step refers to pieces of handling history information within the handling history management information, compares the pieces of handling history information to determine whether a ratio of common portions to an entire history of handling methods is equal to or larger than a certain value, and determines that there are a plurality of common portions when the ratio of common portions is equal to or larger than the certain value.

2. The non-transitory computer-readable medium according to claim 1, wherein the assigning step assigns a higher priority to a handling method candidate included in larger numbers within the handling history information.

3. The non-transitory computer-readable medium according to claim 1, wherein the assigning step assigns a higher priority to a more recently executed handling method candidate with reference to the handling history information.

4. The non-transitory computer-readable medium according to claim 1, wherein the assigning step assigns a higher priority to a handling method candidate, which is originally assigned with a higher priority, with reference to the handling history information.

5. The non-transitory computer-readable medium according to claim 1, wherein the assigning step calculates a priority of each handling method candidate by increasing a weight of a handling method candidate included in handling candidates of handling, which includes a handling candidate common to a handling candidate included in a group of handling method candidates, which are obtained by the obtaining step.

6. The non-transitory computer-readable medium according to claim 1, wherein the integrating step determines that handling histories have a plurality of common portions when one handling history matches a forward portion of another handling history, when one handling history is included in another handling history, or when one handling history matches a backward portion of another handling history.

7. A trouble handling apparatus for putting trouble handling cases occurring in the past in an information system into knowledge data, and for recommending a handling method using a trouble handling knowledge obtained by putting the trouble handling cases into the knowledge data, and a symptom of a trouble when the trouble occurs, the trouble handling apparatus comprising:

a storing unit;

a processor that performs a process including:

obtaining candidates of a handling method for a trouble requested to be handled by searching the trouble handling knowledge;

recording to the storing unit a history of handling methods executed for each symptom and a history of candidates of the handling method at the time of the execution as handling history information;

assigning priorities to the candidates of the handling method, with reference to the candidates of the handling method in the handling history information stored in the storing unit;

returning to a handling request source the handling method for the trouble requested to be handled after assigning a priority to the handling method using assigned priority; and integrating, into one, handling history information having a plurality of common portions in handling history information recorded in the handling history management information, wherein:

the assigning step assigns a higher priority to a handling method candidate effective also as to other symptoms being handled, as an appearance frequency of the candidates of the handling method in handling history information of the other symptoms being handled becomes higher, the appearance frequency recognized by referring to handling history information of the other symptoms being handled, the integrating step refers to pieces of handling history information within the handling history management information, compares the pieces of handling history information to determine whether a ratio of common portions to an entire history of handling methods is equal to or larger than a certain value, and determines that there are a plurality of common portions when the ratio of common portions is equal to or larger than the certain value.

8. The trouble handling apparatus according to claim 7, wherein the assigning step assigns a higher priority to a handling method candidate included in larger numbers within the handling history information.

9. The trouble handling apparatus according to claim 7, wherein the assigning step assigns a higher priority to a more recently executed handling method candidate with reference to the handling history information.

10. The trouble handling apparatus according to claim 7, wherein the assigning step assigns a higher priority to a handling method candidate, which is originally assigned with a higher priority, with reference to the handling history information.

11. The trouble handling apparatus according to claim 7, wherein the assigning step calculates a priority of each handling method candidate by increasing a weight of a handling method candidate included in handling candidates of handling, which includes a handling candidate common to a handling candidate included in a group of handling method candidates, with reference to the handling history management information.

12. The trouble handling apparatus according to claim 7, wherein the integrating step determines that handling histories have a plurality of common portions when one handling history matches a forward portion of another handling history, when one handling history is included in another handling history, or when one handling history matches a backward portion of another handling history.

13. A trouble handling apparatus for putting trouble handling cases occurring in the past in an information system into knowledge data, and for recommending a handling method using a trouble handling knowledge obtained by putting the trouble handling cases into the knowledge data, and a symptom of a trouble when the trouble occurs, the trouble handling apparatus comprising:

a storing unit that stores handling history management information including a pair of each handling ID and handling history information corresponding to each handling ID in the storing unit, the handling history information including a history of handling methods executed for each symptom and a history of candidates of the handling method at the time of the execution;

a processor that performs a process including:
  receiving a handling request including a handling ID and a symptom of a trouble from a terminal of a user, and for returning a handling ID and a handling method in response to the handling request;
  obtaining candidates of a handling method corresponding to the symptom of the trouble included in the handling request by searching the trouble handling knowledge;
  assigning priorities to the handling method candidates with reference to the candidates of the handling method in the handling history information stored in the storing unit, and adding a pair of the handling ID and the handling methods assigned with the priorities to the handling history management information within the storing unit as handling history information;
  updating a handling method within a handling history of handling history information corresponding to the handling ID, which is included in the handling request, within the handling history management information recorded in the storing unit, with a handling method that is included in the handling request and executed by the user; and
  integrating, into one, handling history information having a plurality of common portions in handling history information recorded in the handling history management information, wherein:

the assigning step assigns a higher priority to a handling method candidate effective also as to other symptoms being handled, as an appearance frequency of the candidates of the handling method in handling history information of the other symptoms being handled becomes higher, the appearance frequency recognized by referring to handling history information of the other symptoms being handled, and the integrating step refers to pieces of handling history information within the handling history management information, compares the pieces of handling history information to determine whether a ratio of common portions to an entire history of handling methods is equal to or larger than a certain value, and determines that there are a plurality of common portions when the ratio of common portions is equal to or larger than the certain value.

* * * * *